(12) United States Patent
Selman et al.

(10) Patent No.: US 9,182,517 B1
(45) Date of Patent: *Nov. 10, 2015

(54) DRILLING RIG FOR HORIZONTAL, LATERAL, AND DIRECTIONAL DRILLING THAT IS ADJUSTABLE IN REAL TIME

(75) Inventors: Thomas H. Selman, Midland, TX (US); Matthew J. Jennings, Midland, TX (US)

(73) Assignee: SELMAN AND ASSOCIATES, LTD., Midland, TX (US)

( * ) Notice: Subject to any disclaimer, the term of this patent is extended or adjusted under 35 U.S.C. 154(b) by 854 days.

This patent is subject to a terminal disclaimer.

(21) Appl. No.: 13/243,494

(22) Filed: Sep. 23, 2011

Related U.S. Application Data

(63) Continuation-in-part of application No. 12/879,732, filed on Sep. 10, 2010, now Pat. No. 8,463,550, and a continuation-in-part of application No. 12/879,708, filed on Sep. 10, 2010, now Pat. No. 8,463,549.

(51) Int. Cl.
  *G01V 1/40* (2006.01)
  *G01V 5/04* (2006.01)
  *G01V 3/18* (2006.01)

(52) U.S. Cl.
  CPC ... *G01V 5/04* (2013.01); *G01V 1/40* (2013.01); *G01V 3/18* (2013.01)

(58) Field of Classification Search
  CPC .............. G01V 1/40; G01V 3/18; G01V 5/04
  See application file for complete search history.

(56) References Cited

U.S. PATENT DOCUMENTS

| | | | |
|---|---|---|---|
| 2005/0127282 A1* | 6/2005 | Grau et al. | 250/262 |
| 2006/0161406 A1* | 7/2006 | Kelfoun | 703/10 |
| 2009/0090555 A1* | 4/2009 | Boone et al. | 175/45 |

* cited by examiner

*Primary Examiner* — Hyun Park
(74) *Attorney, Agent, or Firm* — Buskop Law Group, PC; Wendy Buskop

(57) ABSTRACT

A drilling rig for geo-steering during directional drilling of a wellbore including a processor, a data storage, and client devices in communication with the processor through a network. The processor can receive data from directional drilling equipment and can present that data to users in an executive dashboard. Users can send data and/or commands to the directional drilling equipment. The executive dashboard can present a portion of interest in a stratigraphic cross section for user identification of the drill bit in the stratigraphic cross section, formations in the stratigraphic cross section, and other formation data. The system can be used to identify a projected path for the drill bit, import data, compute wellbore profiles and stratigraphic cross sections, plot actual drilling paths, overlay the actual drilling path onto the projected path, and present control buttons to the user.

18 Claims, 16 Drawing Sheets

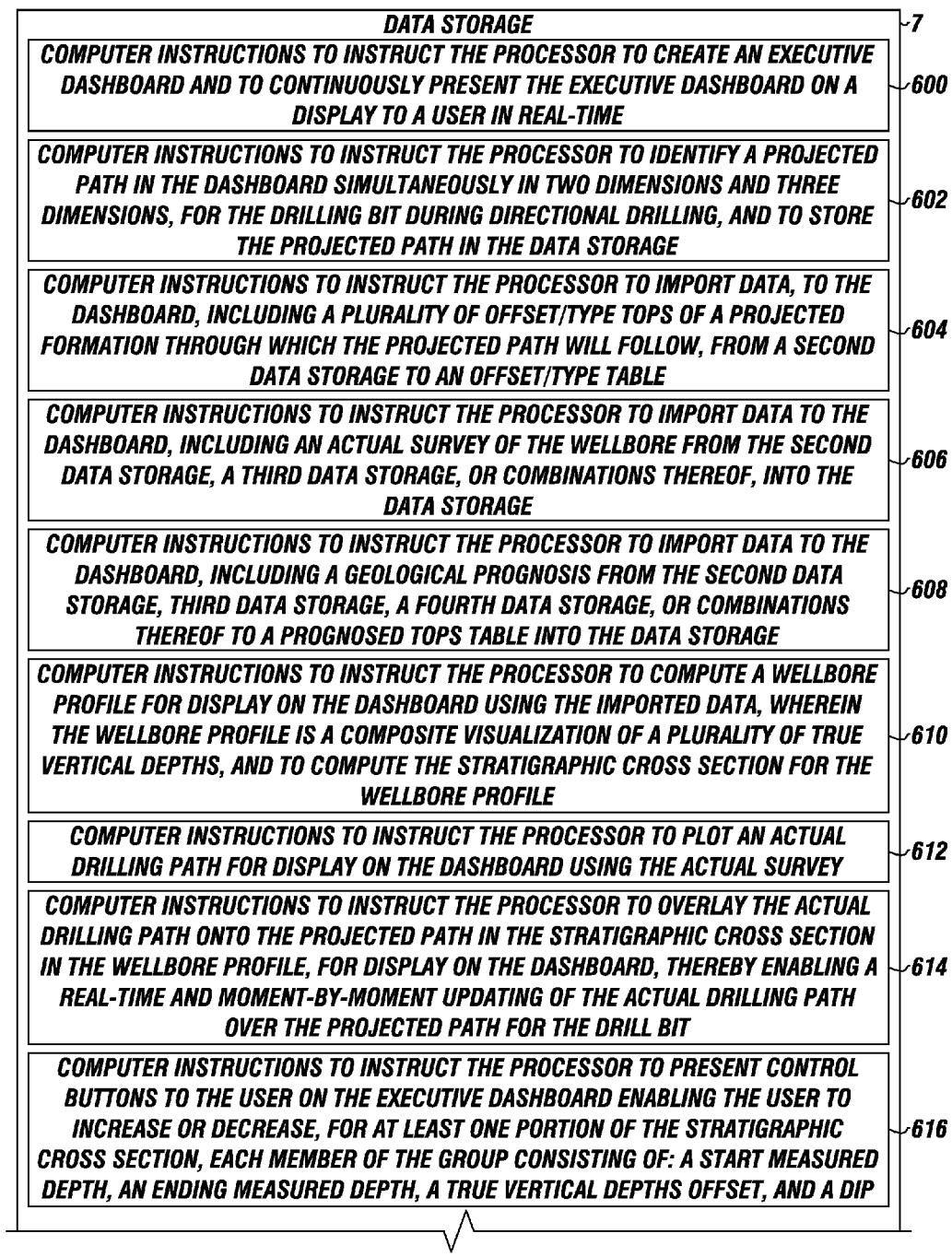

FIGURE 6B

| | |
|---|---|
| COMPUTER INSTRUCTIONS TO INSTRUCT THE PROCESSOR TO ENABLE THE USER TO INCREASE OR DECREASE VALUES ASSOCIATED WITH EACH CONTROL BUTTON TO MODIFY: THE START MEASURED DEPTH, THE ENDING MEASURED DEPTH, THE TRUE VERTICAL DEPTHS OFFSET, THE DIP, OR COMBINATIONS THEREOF, ON PORTIONS OF THE STRATIGRAPHIC CROSS SECTION TO CORRECTLY IDENTIFY A LOCATION OF THE DRILL BIT IN THE STRATIGRAPHIC CROSS SECTION | 617 |
| COMPUTER INSTRUCTIONS TO INSTRUCT THE PROCESSOR TO COMPUTE THE TRUE VERTICAL DEPTHS AS MEASURED AT THE PERPENDICULAR ANGLE FROM THE HORIZONTAL PLANE REPRESENTING THE SURFACE SURROUNDING THE WELLBORE USING MEASURED DEPTHS, INCLINATIONS, AND AZIMUTHS; TO PLOT THE TRUE VERTICAL DEPTHS VERSUS THE MEASURED DEPTHS OF THE DRILL BIT; AND TO PRESENT THE PLOTTED TRUE VERTICAL DEPTHS VERSUS THE MEASURED DEPTHS WITHIN THE WELLBORE PROFILE IN THE EXECUTIVE DASHBOARD | 618 |
| COMPUTER INSTRUCTIONS TO INSTRUCT THE PROCESSOR TO PRESENT A FIRST SPEED CONTROL BUTTON IN THE EXECUTIVE DASHBOARD TO CONTROL A RATE OF ADJUSTMENT FOR CONTROL BUTTONS, AND A SECOND SPEED CONTROL BUTTON TO CONTROL A RATE OF ADJUSTMENT FOR CONTROL BUTTONS | 620 |
| COMPUTER INSTRUCTIONS TO INSTRUCT THE PROCESSOR TO TRANSMIT AN ALARM IF CONTINUED DRILLING IN A FORMATION: WILL VIOLATE A PERMIT | 622 |
| COMPUTER INSTRUCTIONS TO INSTRUCT THE PROCESSOR TO SUPERIMPOSE THE PROJECTED PATH FOR THE DRILL BIT OVER A FORMATION STRUCTURE MAP TO DETERMINE FAULTS THROUGH WHICH THE PROJECTED PATH WILL PASS | 624 |
| COMPUTER INSTRUCTIONS TO INSTRUCT THE PROCESSOR TO SUPERIMPOSE THE PROJECTED PATH FOR THE DRILL BIT OVER THE STRATIGRAPHIC CROSS SECTION TO DETERMINE SPECIFIC NEXT FORMATIONS THROUGH WHICH THE PROJECTED PATH WILL PASS | 626 |
| COMPUTER INSTRUCTIONS TO INSTRUCT THE PROCESSOR TO FORM A REPORT OF THE PROJECTED PATH AND THE ACTUAL DRILLING PATH, AND TO PRESENT THE REPORT OF THE PROJECTED PATH AND THE ACTUAL DRILLING PATH IN THE EXECUTIVE DASHBOARD TO BE VIEWED IN REAL-TIME BY A PLURALITY OF USERS SIMULTANEOUSLY | 628 |
| COMPUTER INSTRUCTIONS TO INSTRUCT THE PROCESSOR TO FORM A REPORT OF PAST DRILLING DATA AND PLANNED DRILLING ACTIONS ASSOCIATED WITH THE EXECUTIVE DASHBOARD | 630 |
| COMPUTER INSTRUCTIONS TO INSTRUCT THE PROCESSOR TO DISPLAY IN THE EXECUTIVE DASHBOARD AN ACTUAL LOCATION OF THE DRILL BIT ON THE ACTUAL DRILLING PATH FOR INSTANTANEOUS IDENTIFICATION OF THE DRILL BIT DURING HORIZONTAL DRILLING | 632 |

FIGURE 6C

| | |
|---|---|
| COMPUTER INSTRUCTIONS TO INSTRUCT THE PROCESSOR TO USE A SURFACE ELEVATION OR A ROTARY TABLE BUSHING ELEVATION OF A SURFACE FOR A START OF A BORE HOLE AND AT LEAST ONE OFFSET/TYPE TOPS OF THE PROJECTED FORMATION TO GENERATE THE GEOLOGICAL PROGNOSIS | 634 |
| COMPUTER INSTRUCTIONS TO INSTRUCT THE PROCESSOR TO USE TYPE LOG TOPS FROM A VERTICAL WELL PROXIMATE THE WELLBORE TO CALCULATE THICKNESSES OF FORMATIONS, THICKNESSES OF ROCK BETWEEN FORMATIONS, OTHER GEOLOGICAL FEATURES, OR COMBINATIONS THEREOF | 636 |
| COMPUTER INSTRUCTIONS TO INSTRUCT THE PROCESSOR TO GENERATE THE PROJECTED PATH BY CALCULATING THE PROJECTED PATH USING A KICK OFF POINT, A BUILD RATE, A LANDING POINT, AND A TARGET ANGLE | 638 |
| COMPUTER INSTRUCTIONS TO INSTRUCT THE PROCESSOR TO PROVIDE CORRELATION POINTS FOR AT LEAST ONE ACTUAL CURVE OR AT LEAST ONE POINT ALONG AN ACTUAL CURVE OF THE STRATIGRAPHIC CROSS SECTION, WHEREIN EACH CORRELATION POINT IS TIED TO A KNOWN TYPE LOG CURVE FOR CONFIRMING ACCURACY OF THE ACTUAL CURVE, ACCURACY OF A FIT OF THE ACTUAL CURVE TO THE KNOWN TYPE LOG CURVE, OR COMBINATIONS THEREOF | 640 |
| COMPUTER INSTRUCTIONS TO INSTRUCT THE PROCESSOR TO PROVIDE CORRELATION POINTS FOR AT LEAST ONE ACTUAL CURVE OR AT LEAST ONE POINT ALONG AN ACTUAL CURVE OF THE STRATIGRAPHIC CROSS SECTION TO ALLOW THE USER TO THICKEN OR THIN EACH ACTUAL CURVE OF THE STRATIGRAPHIC CROSS SECTION TO FIT A KNOWN TYPE LOG CURVE | 642 |
| COMPUTER INSTRUCTIONS TO INSTRUCT THE PROCESSOR TO PRESENT THE PROJECTED PATH IN THE EXECUTIVE DASHBOARD SIMULTANEOUSLY IN TWO DIMENSIONS AND IN THREE DIMENSIONS | 644 |
| COMPUTER INSTRUCTIONS TO INSTRUCT THE PROCESSOR TO STORE DATA RECEIVED FROM THE DIRECTIONAL DRILLING EQUIPMENT WITHIN THE DATA STORAGE | 646 |
| COMPUTER INSTRUCTIONS TO INSTRUCT THE PROCESSOR TO COMMUNICATE OVER A NETWORK AND TO IMPORT THE PLURALITY OF OFFSET/TYPE TOPS OF THE PROJECTED FORMATION THROUGH WHICH THE PROJECTED PATH WILL FOLLOW | 648 |
| COMPUTER INSTRUCTIONS TO INSTRUCT THE PROCESSOR TO SAVE THE WELLBORE PROFILE IN THE DATA STORAGE | 650 |
| COMPUTER INSTRUCTIONS TO INSTRUCT THE PROCESSOR TO TRANSMIT THE WELLBORE PROFILE TO THE DISPLAY | 652 |
| COMPUTER INSTRUCTIONS TO INSTRUCT THE PROCESSOR TO COMPUTE A "DISTANCE TO NEXT FORMATION" USING THE MEASURED DEPTH FROM THE CURRENT FORMATION | 654 |

FIGURE 6D

| | |
|---|---|
| COMPUTER INSTRUCTIONS TO INSTRUCT THE PROCESSOR TO USE AN ESTIMATED TRUE VERTICAL DEPTH OF THE NEXT FORMATION AND A KELLY BUSHING ELEVATION TO COMPUTE AN "ESTIMATED SUBSEA DEPTH OF NEXT FORMATION" | 656 |
| COMPUTER INSTRUCTIONS TO INSTRUCT THE PROCESSOR TO DETERMINE A "CURRENT DIP" | 658 |
| COMPUTER INSTRUCTIONS TO INSTRUCT THE PROCESSOR TO CALCULATE A "CURRENT TRUE VERTICAL DEPTH" | 660 |
| COMPUTER INSTRUCTIONS TO INSTRUCT THE PROCESSOR TO PRESENT THE REPORTS TO THE USER IN ADDITION TO AND SIMULTANEOUSLY WITH THE EXECUTIVE DASHBOARD | 662 |
| COMPUTER INSTRUCTIONS TO INSTRUCT THE PROCESSOR TO CONFIGURE THE EXECUTIVE DASHBOARD TO ALLOW USERS TO HIGHLIGHT PORTIONS OF THE WELLBORE PROFILE | 664 |
| COMPUTER INSTRUCTIONS TO INSTRUCT THE PROCESSOR TO PLOT AN ACTUAL CURVE AND TO PLOT A TYPE LOG CURVE FOR USE WITHIN THE SAME GRAPH | 666 |
| COMPUTER INSTRUCTIONS TO INSTRUCT THE PROCESSOR TO FORM A PLOT OF A PORTION OF THE ACTUAL CURVE WITHIN THE PORTION OF INTEREST IN THE STRATIGRAPHIC SECTION VERSUS THE TARGET RELATIVE DEPTH SCALE | 668 |
| COMPUTER INSTRUCTIONS TO INSTRUCT THE PROCESSOR TO CALCULATE A CHANGE IN TRUE VERTICAL DEPTH DUE TO A DIP | 670 |
| COMPUTER INSTRUCTIONS TO INSTRUCT THE PROCESSOR TO CALCULATE THE TRUE VERTICAL DEPTH AT THE STARTING MEASURED DEPTH FOR THE STRATIGRAPHIC SECTION USING THE ACTUAL SURVEY STORED IN THE DATA STORAGE | 672 |
| COMPUTER INSTRUCTIONS TO INSTRUCT THE PROCESSOR TO CALCULATE THE TRUE VERTICAL DEPTH AT THE MEASURED DEPTH OF THE DATA POINT ALONG THE ACTUAL CURVE USING THE ACTUAL SURVEY WITHIN THE DATA STORAGE | 674 |
| COMPUTER INSTRUCTIONS TO INSTRUCT THE PROCESSOR TO CALCULATE A CHANGE IN THE TRUE VERTICAL DEPTH DUE TO A CHANGE IN TRUE VERTICAL DEPTH IN THE ACTUAL SURVEY BY DETERMINING A DIFFERENCE BETWEEN THE TRUE VERTICAL DEPTH AT THE STARTING MEASURED DEPTH AND THE TRUE VERTICAL DEPTH AT THE MEASURED DEPTH AT THE DATA POINT ALONG THE ACTUAL CURVE | 676 |
| COMPUTER INSTRUCTIONS TO INSTRUCT THE PROCESSOR TO CALCULATE A CHANGE IN TARGET RELATIVE DEPTH BY PERFORMING A SUMMATION OF THE CHANGE IN TRUE VERTICAL DEPTH DUE TO DIP AND THE CHANGE IN TRUE VERTICAL DEPTH DUE TO THE CHANGE IN TRUE VERTICAL DEPTH IN THE ACTUAL SURVEY | 678 |

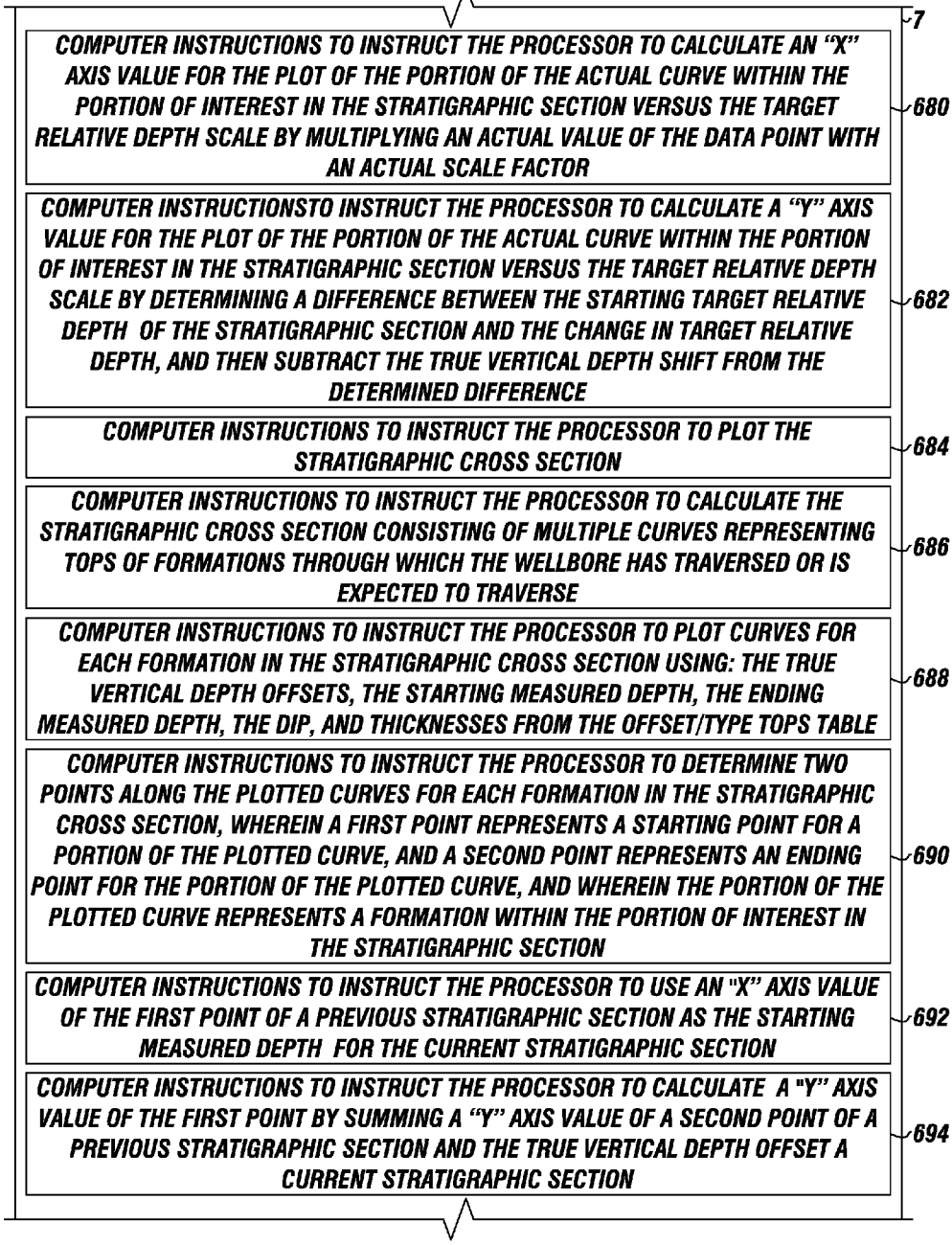

22

| WELL NAME: | PUMA #5 | | GEOLOGIST: | GEORGE JONES | 168 |
|---|---|---|---|---|---|
| COUNTY: | MIDLAND | | KB ELEVATION: | 1234 | |
| Geologist: | GEORGE JONES | email: | Confirm at Rig | | |
| Office: | 432-555-4321 | gjones@selmanlog.com | | | |
| Cell: | 432-555-1234 | | Date: 08/29/10 | | |

PAYZONES: UPPER TOMMY LOWER TOMMY  — 170

| FORMATION (172) | TOP (174) | BASE (178) | HEIGHT |
|---|---|---|---|
| FRESHWATER | 254 | 255 | 1 |
| SALT WATER | 376 | 376 | 0 |
| SELMAN SAND | 1734 | 1764 | 30 |
| THOMAS SS | 2822 | 3369 | 547 |
| BRIAN SHALE | 3632 | 4089 | 457 |
| JUSTIN MARKER 1 | 4473 | 4536 | 63 |
| ELLIE SAND | 6234 | 6264 | 30 |
| JODI SHALE | 6377 | 6381 | 4 |
| UPPER TOMMY | 6418 | 6541 | 123 |
| NIKKI SAND | 6484 | 6494 | 10 |
| BASE NIKKI SAND | 6541 | 6591 | 50 |
| LOWER TOMMY | 6591 | 6732 | 141 |
| MATT SPRINGS | 6682 | 6732 | 50 |
| HARD BOTTOM | 6732 | 6824 | 92 |

COMMENTS: TD: 6632

Target Line — 180
*6632 TVD @ 725' VS @ 90 DEG. (+30 -30)

L.P. SubSea  -5100

SIGNATURE:  GEORGE JONES

FIGURE 7

Editing Table [TYPE LOG] - VERTSEC 3

Table Name: VERTSEC 3

Data Entry: ● TVD ○ SubSea TVD

| Formation / Marker Name | Depth | TVD Top | TVD Base | SS TVD Top | SS TVD Base | Thickness |
|---|---|---|---|---|---|---|
| SELMAN SAND | 2110.0 | 2110.0 | 2145.0 | -876.0 | -911.0 | 35.0 |
| JUANITA SHALE | 2145.0 | 2145.0 | 3252.0 | -911.0 | -2018.0 | 1107.0 |
| SELMAN SAND 2 | 3252.0 | 3252.0 | 3744.0 | -2018.0 | -2510.0 | 492.0 |
| MIDLAND SILT MARKER | 3744.0 | 3744.0 | 4008.0 | -2510.0 | -2774.0 | 264.0 |
| MATTHEW SHALE | 4008.0 | 4008.0 | 4465.0 | -2774.0 | -3231.0 | 457.0 |
| BOTTOM OF MATTHEW SHALE | 4465.0 | 4465.0 | 4805.0 | -3231.0 | -3571.0 | 340.0 |
| THOMAS SS | 4805.0 | 4805.0 | 4850.0 | -3571.0 | -3616.0 | 45.0 |
| BASE THOMAS SS | 4850.0 | 4850.0 | 4962.0 | -3616.0 | -3728.0 | 112.0 |
| BRIAN SHALE | 4962.0 | 4962.0 | 5266.0 | -3728.0 | -4032.0 | 304.0 |
| BRIAN MARKER 1 | 5266.0 | 5266.0 | 5296.0 | -4032.0 | -4062.0 | 30.0 |

[ Save and Close ]  [ Save ]  [ Close ]

| Tool | MD | Inclination | Azimuth | TVD | SSTVD | VS | N | E | CL | CD | CA | DLS | Build | Walk | BRN | RF |
|---|---|---|---|---|---|---|---|---|---|---|---|---|---|---|---|---|
| Tie In | 5830 | 2.2 | 196.78 | 5824.9 | -4590.90 | 115.70 | -162.50 | -54.50 | 0 | 0.00 | 0.00 | 0.00 | 0.00 | 0.00 | 0.00 | 1.00000000 |
| GYRO | 5859 | 1.5 | 206.1 | 5853.88 | -4619.88 | 111.80 | -163.37 | -54.83 | 29 | 172.33 | 198.55 | 2.62 | -2.41 | 32.14 | 7.17 | 1.00001465 |
| GYRO | 5890 | 2.3 | 172.8 | 5884.87 | -4650.87 | 112.59 | -164.36 | -54.93 | 31 | 173.29 | 198.48 | 4.29 | 2.58 | -107.42 | 7.36 | 1.00004500 |
| GYRO | 5921 | 4.2 | 158.3 | 5915.82 | -4681.82 | 114.28 | -166.03 | -54.43 | 31 | 174.72 | 198.15 | 6.63 | 6.13 | -46.77 | 7.41 | 1.00010726 |
| GYRO | 5951 | 6.2 | 153 | 5945.69 | -4711.69 | 116.98 | -168.49 | -53.29 | 30 | 176.72 | 197.55 | 6.85 | 6.67 | -17.67 | 7.45 | 1.00010719 |
| GYRO | 5981 | 9 | 149.6 | 5975.43 | -4741.43 | 120.94 | -171.96 | -51.37 | 30 | 179.47 | 196.63 | 9.45 | 9.33 | -11.33 | 7.36 | 1.00020402 |
| GYRO | 6012 | 11.7 | 150.9 | 6005.92 | -4771.92 | 126.51 | -176.80 | -48.61 | 31 | 183.36 | 195.37 | 8.74 | 8.71 | 4.19 | 7.29 | 1.00018646 |
| GYRO | 6042 | 14 | 151.7 | 6035.17 | -4801.17 | 133.18 | -182.65 | -45.41 | 30 | 188.21 | 193.96 | 7.69 | 7.67 | 2.67 | 7.28 | 1.00013510 |
| GYRO | 6073 | 16.7 | 151.8 | 6065.06 | -4831.06 | 141.37 | -189.88 | -41.53 | 31 | 194.37 | 192.34 | 8.71 | 8.71 | 0.32 | 7.20 | 1.00018511 |

FIGURE 11

Editing Table [PROGNOSED TOPS TABLE] - VERTSEC 3 — 24

Table Name: VERTSEC 3 — 181

Data Entry: ● TVD  ○ SubSea TVD — 194, 195

| Formation / Marker Name | Depth | TVD Top | TVD Base | SS TVD Top | SS TVD Base | Thickness |
|---|---|---|---|---|---|---|
| SELMAN SAND | 2144.0 | 2144.0 | 2179.0 | -910.0 | -945.0 | 35.0 |
| JUANITA SHALE | 2179.0 | 2179.0 | 3286.0 | -945.0 | -2052.0 | 1107.0 |
| SELMAN SAND 2 | 3286.0 | 3286.0 | 3788.0 | -2052.0 | -2544.0 | 492.0 |
| MIDLAND SILT MARKER | 3788.0 | 3788.0 | 4042.0 | -2544.0 | -2812.0 | 264.0 |
| MATTHEW SHALE | 4042.0 | 4042.0 | 4499.0 | -2812.0 | -3265.0 | 457.0 |
| BOTTOM OF MATTHEW SHALE | 4499.0 | 4499.0 | 4839.0 | -3265.0 | -3605.0 | 340.0 |
| THOMAS SS | 4839.0 | 4839.0 | 4884.0 | -3605.0 | -3650.0 | 45.0 |
| BASE THOMAS SS | 4884.0 | 4884.0 | 4996.0 | -3650.0 | -3762.0 | 112.0 |
| BRIAN SHALE | 4996.0 | 4996.0 | 5300.0 | -3762.0 | -4066.0 | 304.0 |
| BRIAN MARKER 1 | 5300.0 | 5300.0 | 5330.0 | -4066.0 | -4096.0 | 30.0 |

182, 184, 186, 188, 190, 192, 191

14a, 14d, 14g, 14j

Save and Close — 193   Save — 197   Close — 199

DRILLING RIG FOR HORIZONTAL, LATERAL, AND DIRECTIONAL DRILLING THAT IS ADJUSTABLE IN REAL TIME

CROSS REFERENCE TO RELATED APPLICATIONS

The present application is a continuation-in-part of co-pending U.S. patent application Ser. No. 12/879,732 filed on Sep. 10, 2010, entitled "SYSTEM FOR GEOSTEERING DIRECTIONAL DRILLING APPARATUS", and is a continuation-in-part to U.S. patent application Ser. No. 12/879,708 filed on Sep. 10, 2010, entitled "METHOD FOR GEO-STEERING DIRECTIONAL DRILLING APPARATUS." These references are incorporated herein in their entirety.

FIELD

The present embodiments generally relate to a drilling rig for horizontal, lateral, and directional drilling, wherein drilling operations are adjustable in real time

BACKGROUND

A need exists for a drilling rig for geo-steering directional drilling equipment, such as horizontal drilling equipment, that can provide real-time formation information.

A further need exists for real-time location identification for a drilling bit during horizontal drilling.

The present embodiments meet these needs.

BRIEF DESCRIPTION OF THE DRAWINGS

The detailed description will be better understood in conjunction with the accompanying drawings as follows:

FIGS. 6A-6F depict a data storage of the system.

FIG. 7 is a presentation of a geological prognosis usable according to one or more embodiments.

FIG. 8 is a representation of an offset/type table usable in the system.

FIG. 9 is a representation of an actual survey usable in the system.

FIG. 11 depicts an embodiment of a prognosed tops table.

Figure 1:
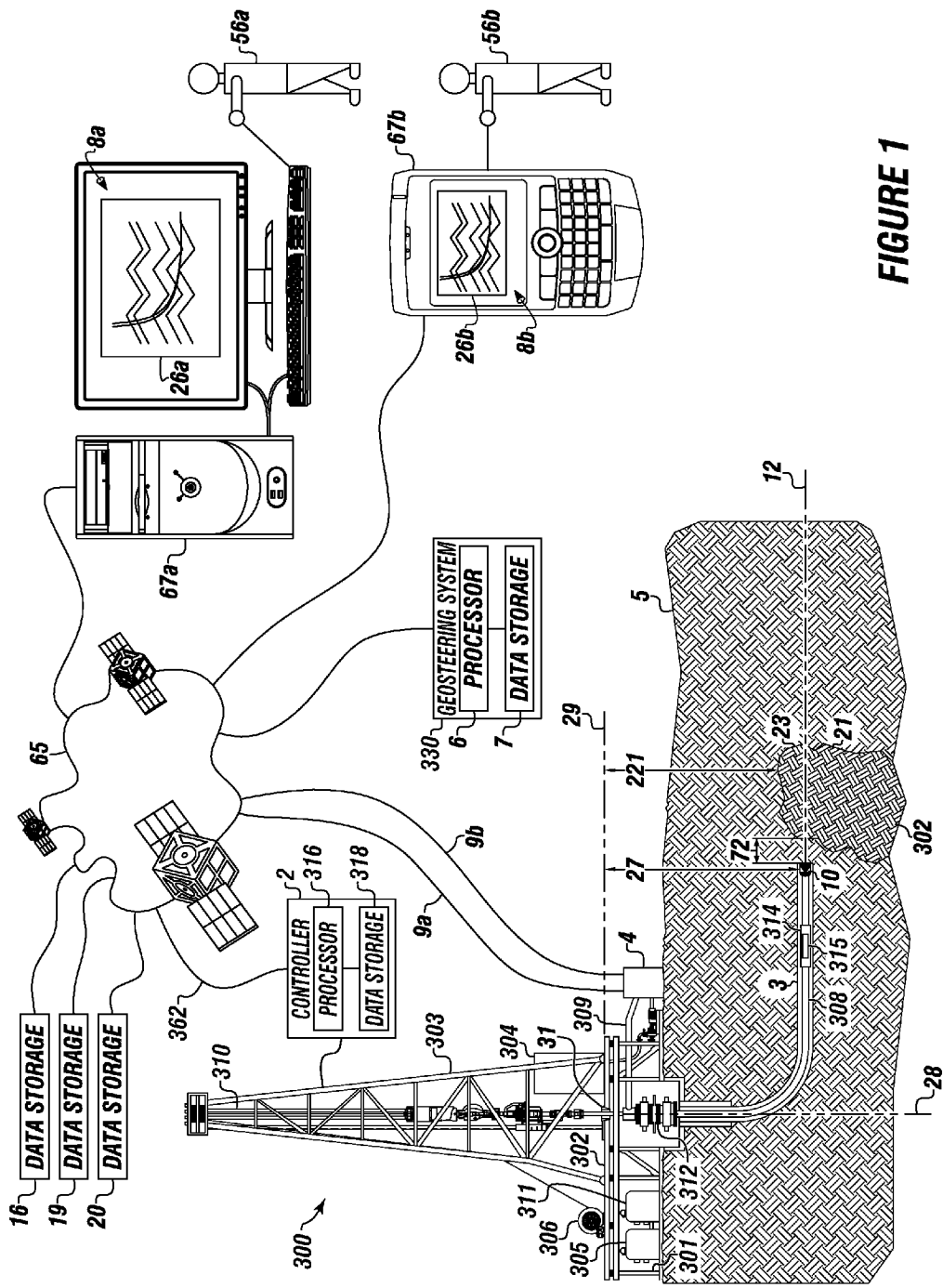
FIG. 1 is a schematic representation of a drilling rig with geo-steering system.

The present embodiments are detailed below with reference to the listed Figures.

DETAILED DESCRIPTION OF THE EMBODIMENTS

Before explaining the present system and associated method in detail, it is to be understood that the system and associated method are not limited to the particular embodiments and that the embodiments can be practiced or carried out in various ways.

One or more of the present embodiments generally relate to a drilling rig for horizontal, lateral, and directional drilling, wherein drilling operations are adjustable in real time The drilling rig can be used for horizontal, lateral, and directional drilling. The drilling operations performed by the drilling rig can be adjusted in real time. The drilling rig can have the ability to change direction to stay on target in the wellbore The drilling rig can include a sub structure. The substructure can include a base. A mast or derrick can be supported by the base.

A pipe handler can be operatively connected with the substructure. The substructure can be configured to place pipe in an operation position. For example, the pipe handler can be used to operatively engage pipe with a top drive connected with the derrick.

The substructure connected with one or more mud pumps. The mud pumps can provide drilling fluids downhole.

A draw works can be connected with the substructure. The draw works can be configured to move the top drive during drilling operations. For example, the draw works can be connected to the top drive by cabling.

The pipe provided to the top drive can be connected near the base of the drilling rig to form a drill string. In one or more embodiments, a drill bit can be connected to the drill string.

Piping can be used to provide fluid communication between portions of the rig or the wellhead. For example, piping can be used to provide fluid communication between the mud pumps and the wellhead.

A power source can be used to drive the mud pumps, the draw works, and other components of the drill rig.

A blow out preventer can be operatively disposed at the wellhead. The drill rig can also include directional drilling equipment.

A controller can be operatively connected with the drilling rig. The controller can control the directional drilling equipment, the mud pumps, the draw works, and other components of the drilling rig.

The controller can include a controller processor. The controller processor can be in communication with controller data storage.

The controller can collect wellbore data from a tool connected to the drill string in the wellbore.

The controller can transmit collected transmitting the wellbore data collected to the system for geo-steering.

The system for geo-steering can use a geo-steering processor to analyze data in real time.

The geo-steering system can also identify a projected path for the drill string during directional drilling. The project path can be calculated using the data. The projected path and collected data can be stored in a data storage of the geo-steering system.

The geo-steering system can also compute a wellbore profile. The wellbore profile can be calculated using the collected data. The wellbore profile can be a composite visualization of a plurality of true vertical depths.

The geo-steering system can also compute a stratigraphic cross section for the wellbore profile.

The stratigraphic cross section can include a formation dipping away from a perpendicular angle to a horizontal plane representing a surface surrounding the wellbore.

The stratigraphic cross section can also include a formation dipping toward the perpendicular angle to the horizontal plane representing the surface surrounding the wellbore.

The geo-steering system can also plot an actual drilling path for the drill string using an actual survey from the actual drilling path.

The geo-steering system can also overlay the actual drilling path onto a projected path in the stratigraphic cross section in the wellbore profile, enabling real-time updating of the actual drilling path over the projected path as an executive dashboard.

The geo-steering system can transmit the executive dashboard from the geo-steering system to the drill rig, indicating that the wellbore of the drill string operated by the drill rig is on target or off target.

The geo-steering system can also transmit the executive dashboard to a multidimensional simulation, allowing a user to select a dimensional plot of the operation of the drill rig.

The equipment can form an operational drilling rig with horizontal, lateral, and directional drilling, and the drilling operations performed by the drill rig can be adjusted in real time. The drill rig can have the ability to change direction to stay on target in the wellbore within 3 to 12 hours.

The geo-steering system can include computer software designed to import and export WITS-compliant information. WITS, as used herein, stands for Wellsite Information Transfer Specification.

The computer software can enable a user of the system to receive and send updated drilling and seismic survey data from a plurality of formats, such as: WITSML, WITS, Log ASCII Standard (LAS), different streaming formats, different logging formats, and other formats installed for use. The receiving and sending of updated drilling and seismic survey data from the plurality of formats can occur in real-time, such as in a matter of seconds.

One or more embodiments of the system can be used: solely in the field adjacent a drilling site; remote from the drilling site, such as at an office; at sea on a subsea well site; or simultaneously from various remote and field locations. The system can include an executive dashboard program that can be used to present data to a plurality of users simultaneously and in real-time. The executive dashboard can allow users to simultaneously view numerous pieces of data and information associated with the drilling.

The system can enable users, which can be computers, to more efficiently and effectively determine stratigraphy, dipping, and faulting by using graphical matching of actual curve data against reference curves, such as type log curves, using real-time drilling data.

The system can help users visualize formation structures by allowing users to explore formation structures in three dimensions and in two dimensions, and to explore different segments of a stratigraphic section or map simultaneously, thereby allowing the users to determine where a drilling bit is within a wellbore. The system can therefore be used to avoid disasters associated with formation problems, such as unexpected faults and the like.

One or more embodiments of the system for geo-steering, also referred to as geo-steering, of directional drilling equipment can include a processor in communication with directional drilling equipment and with a data storage. The communication can occur through a network. The processor and the data storage can be used to receive and send data to the directional drilling equipment, and to control at least portions of the directional drilling equipment. The directional drilling equipment can include mud pumps, mud tanks, drilling pipe, controls, directional tools installed on a drill string, and similar conventional directional drilling equipment. The data received from the directional drilling equipment can be an inclination of the wellbore as measured by a directional drilling tool, such as a sensor or gyro; a measured depth of the wellbore, such as a measured depth measured by a depth encoder on a crown of the drilling rig; a tool depth, which can be the measured depth minus the distance of the tool from the bottom of the drill string; an azimuth as measured by a sensor on a directional drilling tool; and actual curve data such as gamma ray readings and resistivity readings as measured by sensors on directional drilling tools. The processor can send data and/or commands to the directional drilling equipment or to user's operating the directional drilling equipment, such as user's viewing the executive dashboard at the drilling site. The data and/or commands can include all of the data that can be presented in the executive dashboard as described herein and a suggested build rate to remain at a target depth or in a target formation, as well as other instructions regarding drilling. The commands can be: commands that directly control the directional drilling equipment, suggestions and/or instructions to users on how to control the directional drilling equipment, or combinations thereof.

One or more embodiments can include client devices in communication with the processor through the network. The client devices can be: computers; mobile devices, such as cellular phones; laptop computers; or another type of client device having communication means, processing means, and data storing means. Each client device can have a processor, a data storage, and a display. The network can be a wireless network, a wired network, or any other type of communications network.

In one or more embodiments, the processor with the data storage can be disposed at a drilling site, remote from the drilling site, or combinations thereof. The system can be used to form a new wellbore at the drilling site, such as in land that has not been previously drilled. Also, the system can be used to expand an existing wellbore. For example, the processor can be in communication with the directional drilling equipment, such as horizontal drilling equipment, for monitoring and controlling the drilling equipment.

The data storage can include a plurality of computer instructions. The data storage can include computer instructions to instruct the processor to create and present an executive dashboard. The executive dashboard can be presented to a user on a display of the user's client device. The executive dashboard can include a presentation of: a section of a formation, a location of a drill bit on a real-time basis, and other data associated with the drilling.

The executive dashboard can present numerous continuously updated data and pieces of information to a single user or simultaneously to a plurality of users connected together over the network. The executive dashboard can provide the users with the ability to continually monitor the drilling in real-time during the occurrence of the drilling in order to avoid dangers and environmental problems, such as disasters that occur in the Gulf of Mexico.

The system can be used to enable users, such as responders, to quickly view the drilling to determine whether or not an actual drilling path of the drill bit is in compliance with a projected drilling path of the drill bit. For example, a projected drilling path can be determined and/or formed in order to prevent excursion into areas that can cause: damage to a water supply; an explosion; significant harm to humans, structures, or animals at the surface of the wellbore; or significant harm to marine life in a body of water. With the executive dashboard disclosed herein, the user can view the actual drill path and compare that to the projected drill path in real-time in order to avoid dangers. Real-time presentation of data onto the executive dashboard can refer to data that is presented on the executive dashboard in no more than ten seconds after the actual occurrence of an event associated with the data. For example, if the real-time presentation of data includes a location of the drill bit, the actual location of the drill bit can be measured and transmitted to the executive dashboard within ten seconds.

The executive dashboard can enable a user to view portions of interest in a stratigraphic cross section of the wellbore. The portions of interest in the stratigraphic cross section of the wellbore can be used to correctly identify a location of a drill bit within the wellbore. The identification of the location of the drill bit within the stratigraphic cross section, and therefore within the actual wellbore, allows a user to initiate action to fix any deviations of the actual drilling path from the projected drilling path.

The data storage can include computer instructions to instruct the processor to present an overlay of the actual drilling path over the projected drilling path. The data storage can include computer instructions to provide an alarm to the user, such as to the user's display, when a deviation of the actual drilling path from the projected path occurs.

The data storage can include computer instructions to instruct the processor to identify the projected path of a drilling bit used in directional drilling. For example, the processor can use a current inclination of the drill bit and a current true vertical depth of the drill bit to determine the projected path. The projected path can be a line from the current actual location of the drill bit and extending to a projected location of the drill bit that is estimated to occur in the future, given the current inclination of the drill bit and the current true vertical depth of the drill bit.

The data storage can include computer instructions to instruct the processor to enable a selected projected path to be simultaneously viewed in two dimensions and in three dimensions within the executive dashboard.

The data storage can include computer instructions to present all data, information, multidimensional data, and images from the directional drilling equipment to a user on the user's client device as an executive dashboard. The data storage can include computer instructions to store all data, information, multidimensional data, and images from the directional drilling equipment in the data storage.

The data storage can include computer instructions to instruct the processor to communicate over the network to import data including a plurality of offset/type tops of formations. The imported plurality of offset/type tops of formations can include offset/type tops of formations that are projected to be traversed by the drill bit along the projected path. The data storage can include computer instructions to instruct the processor to save the imported plurality of offset/type tops of formations in an offset/type table in the data storage. The offset/type table can be presented within the executive dashboard. An offset/type top of a formation, as the term used herein, can be a depth of a type log curve that has been selected and that corresponds to certain feature, such as tops of formations, markers, and other features. The type log curve can be a curve that includes multiple data points, such as those from a gamma ray analysis or another commonly known analytical method. Each data point can include a magnitude and a depth.

The data storage can include computer instructions to instruct the processor to import data including an actual survey of the wellbore. The actual survey data can include: a plurality of azimuths for the wellbore, a plurality of inclinations for the wellbore, a plurality of measured depth points for the wellbore path, and other data and information associated with an actual survey of the wellbore. The actual survey data can be stored in the data storage using computer instructions, and can be presented within the executive dashboard.

The data storage can include computer instructions to instruct the processor to import data including a geological prognosis on the wellbore site to a prognosed tops table, which can then be stored in the data storage. The geological prognosis can include: at least one depth for at least one formation top, a formation top through which the drill bit is expected to pass along the projected path, and other information. The prognosed tops table can be presented in the executive dashboard.

The data storage can include computer instructions to instruct the processor to construct a wellbore profile, to save the wellbore profile in the data storage, and to present the wellbore profile in the executive dashboard. The wellbore profile can include a composite visualization of a plurality of true vertical depths (TVD) of the wellbore, as can be more easily understood with reference to the figures below.

The data storage can include computer instructions to instruct the processor to use the imported data to form a stratigraphic cross section in the wellbore profile. The data storage can include computer instructions to instruct the processor to position the actual location of the drill bit onto the stratigraphic cross section. The stratigraphic cross section can include a depiction of a formation dipping away from a perpendicular angle from a horizontal plane representing the surface surrounding the wellbore. The stratigraphic cross section can include a depiction of a formation dipping toward the perpendicular angle from the horizontal plane representing the surface surrounding the wellbore.

The data storage can include computer instructions to instruct the processor to compute and plot the actual drilling path using the actual survey data. The data storage can include computer instructions to overlay the actual drilling path onto the stratigraphic cross section. The stratigraphic cross section can continuously be viewable in the executive dashboard in both three dimensions and two dimensions, such as during overlaying. The actual drilling path can be overlaid and plotted onto the projected path for the drilling bit in the stratigraphic cross section of the wellbore profile. With the actual drilling path overlaid and plotted onto the projected path for the drilling bit, the users can monitor the actual drilling path in real-time on the executive dashboard. The actual drilling path in view of the projected path of the drilling bit can be updated continually and/or continuously for real-time presentation on the executive dashboard.

The data storage can include computer instructions configured to instruct the processor to present a plurality of control buttons on a display within the executive dashboard. The control buttons can be viewed and operated by users. For example, the user can increase or decrease a starting measured depth of the drilling to predict drilling paths using one or more of the control buttons. The user can modify an ending measured depth of the drilling using one or more of the control buttons. The user can use the control buttons to modify values by increasing or decreasing the true vertical depth offset. The user can use the control buttons to increase or decrease dip or dip angle of formations, and to change which section of the wellbore is a portion of interest in the stratigraphic cross section.

In one or more embodiments, the data storage can include computer instructions configured to allow a user to increase or decrease values associated with each control button to modify: the start measured depth, ending measured depth, true vertical depth offset, dip or dip angle, or combinations thereof, of portions of interest in the stratigraphic cross section to correctly identify the location of the drill bit in the stratigraphic cross section.

One or more embodiments can include computer instructions to instruct the processor to measure a distance, such as in feet or meters, at a perpendicular angle from a horizontal plane representing the surface surrounding the wellbore or the true vertical depth of the wellbore. The measurements can be initiated from a rotary table bushing, also known as a kelly bushing, to determine a current or final depth of the wellbore as plotted against the measured depth of a borehole. The measured depth of the wellbore can be equivalent to a length of the drill string when the drill bit is at a bottom or end of the borehole.

The data storage can include computer instructions to instruct the processor to present additional control buttons that control the rates of adjustment or granularity of the other controls.

The data storage can include computer instructions to instruct the processor to provide an alarm. The alarm can be provided when it appears or is determined that continued drilling within a formation will violate a permit, cause a safety hazard, cause an environmental hazard, cause an economic hazard, cause another hazard, or combinations thereof.

The data storage can include computer instructions to instruct the processor to superimpose the projected path for the drilling bit over a formation structure map, and to position the formation structure map behind the projected path to establish faults in the formation relative to the projected path and/or the actual drilling path. The formation structure map can be imported and/or inputted into the data storage from an external source and saved therein, and can include a calculated stratigraphic cross section before the wellbore has been drilled.

The data storage can include computer instructions to instruct the processor to superimpose the projected path for the drilling bit over stratigraphic cross section, and to position the stratigraphic cross section behind the projected path to establish formations simultaneously both in two dimensions and in three dimensions.

The data storage can include computer instructions to instruct the processor to form at least one report. Each report can include: any information imported and/or inputted into the data storage; any information and/or data stored in the data storage; any data received from the directional drilling equipment; any information and/or data presented within the executive dashboard; any information and/or date included within the various reports described herein; any information and/or data associated with the wellbore, the drilling equipment, and the drilling process; or combinations thereof. Similarly, the executive dashboard can present any information imported and/or inputted into the data storage; any information and/or data stored in the data storage; any data received from the directional drilling equipment; any information and/or date included within the various reports described herein; any information and/or data associated with the wellbore, the drilling equipment, and the drilling process; or combinations thereof.

The data storage can include computer instructions to instruct the processor to plot an actual drilling path on a real-time basis in view of the projected path, and to transmit the plot along with images and a text report to a plurality of users simultaneously over the network for presentation on the executive dashboard.

The executive dashboard can include a report for a wellbore of current information. The current information can include a current measured depth, such as 10500 feet, which can be adjustable using an onscreen control button. The current information can also include a current formation name, such as "Selman Formation." The formation name can be procured from an offset/type log table that the processor can obtain from communicating with another data storage accessible through the network.

The current information can include a "next formation name", such as "Juanita Shale", which can be obtained from the same or a similar data storage. The next formation name can be the name of the next formation through which the drill bit is expected pass through along the projected path. The current information can include location information for the current formation and for the next formation.

The data storage can include computer instructions to instruct the processor to compute a "distance to next formation" from the current formation, and to present the computed distance to next formation to the user within the executive dashboard.

The data storage can include computer instructions to instruct the processor to compute an "estimated subsea depth of next formation", such as −7842 feet, using the kelly bushing elevation and the estimated true vertical depth of the next formation. The estimated subsea depth of next formation can be presented to the user on the executive dashboard.

The data storage can include computer instructions to instruct the processor to compute the "current dip or dip angle." The current dip or dip angle, as the term used herein, can be the angle of a formation referenced from the horizontal plane representing the surface surrounding the wellbore. In operation, if the angle is positive and the angle points towards the surface or is shallower, the current dip or dip angle can be referred to as "dipping towards" the wellbore; whereas if the angle is negative and the angle points away from the surface or is deeper, the current dip or dip angle can be referred to as "dipping away" from the wellbore.

The data storage can include computer instructions to instruct the processor to present a "current true vertical depth" in the executive dashboard, which can represent the distance measured at the perpendicular angle from the horizontal plane representing the surface surrounding the wellbore to the drill bit using the kelly bushing as a reference point on top of the wellbore.

The data storage can include computer instructions to instruct the processor to present a "current subsea true vertical depth" in the executive dashboard. The current subsea true vertical depth can be a true vertical depth that is referenced from sea level, wherein positive numbers can indicate depths that are above sea level and negative numbers can indicate depths that are below sea level.

The data storage can include computer instructions to instruct the processor to present a report to the users in addition to, and simultaneously with, the executive dashboard.

The report can include past drilling data and estimated future drilling data. The report can include at least one, and up to several thousand, formation names, projected tops of each listed formation, and a true vertical depth as drilled for each formation. The report can include a value representing a difference between a projected top of a formation and a formation top as drilled. The report can include a dip or dip angle, measured in degrees, of a plurality of formations as drilled at the tops of the formations. The report can include each drill angle, measured in degrees. The drill angle can be the angle of inclination of the wellbore at the top of the formation as drilled. For example, the drill angle can be 25.3 degrees. The report can include an estimated distance needed for the drill bit to travel to reach a top of the next formation or to reach a selected formation considering the current drill angle and the current dip or dip angle of the formation. The report can include an estimated/actual subsea depth of formation relative to sea level of an encountered formation, of the next formation, or of a selected formation, considering the current drill angle and the current dip or dip angle of the formation.

The report can include identification information. The identification information can include: a job number; a well number; a location in which the well is being drilled, such as a country name, a state name, a county name; a rotary table bushing elevation, such as a kelly bushing elevation; a field name, such as the name of the field where the well is being drilled; a start date for drilling; a start depth for drilling, such as 1240 feet; an API number, wherein the term "API" refers to American Petroleum Institute; a UWI, wherein the term "UWI" refers to a Unique Well Identifier; a ground level elevation, such as 783 feet; a unit number, such as unit 2 of the Lyon field with 12 units; an end date of drilling; an end depth of the drilling, such as 10,700 feet; and other information. The API number can be a unique, permanent, numeric identifier assigned to each well drilled for oil and gas in the United States.

The data storage can include computer instructions to instruct the processor to display an actual location of a drilling bit on the actual drilling path within the executive dashboard for real-time identification of the drilling bit during horizontal drilling.

In one more embodiments, the stratigraphic cross section and/or the portion of interest in the stratigraphic cross section can be calculated using: the offset/type tops section through which the projected path will follow, which can be shown as a thicknesses between lines; the starting measured depths for the stratigraphic section of the wellbore; the ending measured depths for the stratigraphic section of the wellbore; the true vertical depth offset for the stratigraphic section of the wellbore; and the dip angle for the stratigraphic cross section, which can be shown as an angle of tilt in the formation.

In one or more embodiments, the wellbore profile can be displayed with actual curves, which can be gamma ray curves. The wellbore profile can be displayed with curves that are total gas curves. Total gas can be the volume of gas detected at a particular measured depth. The actual curve can be a curve that includes multiple data points, such as those from a gamma ray analysis or another commonly known analytical method. Each data point can include a magnitude and a depth.

The stratigraphic cross section can be presented on the executive dashboard as a colored and/or visual map prior to importing the actual survey. Within the executive dashboard, different colors can represent different estimated tops of formations and other related data.

In one or more embodiments, the wellbore profile can include and provide a plot of the subsea true vertical depth against the true vertical depth and the measured depth of the wellbore.

A unique benefit of one or more embodiments is that projected formations can be presented as a geological hypothesis of the actual geological formation, thereby enabling users to perform adjustments to the drilling equipment in real-time using the data and controls provided by the executive dashboard. The user can adjust different values relative to the geological hypothesis using the control buttons, thereby enabling the geological hypothesis to continue to update as the drilling continues in real-time.

The geological prognosis, as the term used herein, can include a stratigraphic section or map. The stratigraphic section or map can include at least one identified depth of a formation top, at least one identified depth of a formation bottom, at least one anticline, at least one syncline, at least one depth of a fault, at least one bedding plane between two formations, a fracture line of at least one fault, or combinations thereof.

The geological prognosis can be generated using computer instructions stored in the data storage that instruct the processor to use a surface elevation or a rotary table bushing elevation of a surface for a start of a wellbore, and at least one offset/type top of the projected formation provided by a user.

In one or more embodiments, the actual curves and projected curves can be used as gamma curves from a type log.

The overlaying of the projected path onto the stratigraphic cross section can be performed by overlaying the projected path onto a three dimensional stratigraphic cross section, with the three dimensions being: easting, northing, and true vertical depth as overlaid on the azimuth of the projected path.

In one or more embodiments, a type log can be used as a test well to calculate thicknesses of formations and thicknesses of rock between formations. For example, by calculating an absolute value of the difference between the top true vertical depth of a first formation, the Juanita Shale formation, and the top true vertical depth of a second formation, the Nikki Sand formation, which, in this example, is the next deepest formation underneath the first formation, the thickness of the Juanita Shale formation can be obtained.

In one or more embodiments, the plurality of offset/type tops can include a type log. An illustrative type log for the formation Juanita Shale can be the top true vertical depth value of 1,020 feet, and an illustrative type log for the formation Nikki Sand can be the top true vertical depth value of 1,200 feet.

The projected path can be generated using computer instructions in the data storage that instruct the processor to calculate the projected path using a kick off point, such as a depth of 4,500 feet, a build rate, such as 8 degrees/100 feet, and a target depth, such as 6,632 feet. In one or more embodiments, a user can provide the projected path, such as by uploading the projected path into the data storage.

The data storage can include computer instructions to instruct the processor to provide correlation points for at least one actual curve, or for at least one point along an actual curve of a stratigraphic section. Each correlation point can be tied to a known type log curve for confirming accuracy of the actual curve. For example, a plurality of sampling data points along a plot of an actual curve can be compared with sampling data points along a plot of a related type log curve. Correlation between the actual curve and the type log curve can be confirmed when the sampling data points in the actual curve match the sampling data points in the type log curve. An actual curve that has more matching sampling data points with the type log curve has a greater degree of correlation.

One or more embodiments can include computer instructions in the data storage configured to allow a user to thicken or thin a curve of the stratigraphic cross section in order to fit or correlate with type log curves.

In one or more embodiments, the user can be a processor, a computer, or another like device in communication with the processor of the system.

In one or more embodiments, after the wellbore is drilled, a user can analyze the wellbore profile to determine portions of the wellbore that are appropriate for perforation, fracing, and/or production stimulation during completion stage operations. For example, the user can highlight portions of the wellbore within the wellbore profile, such as by using an input device in communication with the executive dashboard. The data storage can include computer instructions to instruct the processor to configure the executive dashboard to allow the user to highlight portions of the wellbore profile within the executive dashboard. The user can highlight portions to indicate the portions of the wellbore that are appropriate for perforation, fracing, and/or production stimulation. Therefore, users, such as engineers, at a location remote for the drilling site can analyze the wellbore profile and can highlight portions for further drilling exploration. Then, users, such as wellbore completion personnel, located at the drilling site can see those highlighted portions on a presentation of the same executive dashboard and can use the information to perform well completion operations. The engineers can therefore use the executive dashboard to communicate to drill site personnel which areas within the wellbore to perform further perforation, fracing, and/or production stimulation. The system therefore provides a unique graphical representation and communication means for indicating perforation, fracing, and/or production stimulation areas within a wellbore.

The user can also highlight portions of the wellbore within the wellbore profile to indicate portions of the wellbore that the user has determined are not appropriate for perforating, fracing, and/or production stimulation. For example, the user can highlight portions of the wellbore that are appropriate for perforating, fracing, and/or production stimulation in a first color, and can highlight portions of the wellbore that are not appropriate for perforating, fracing, and/or production stimulation in a second color. Users of the system can therefore more efficiently implement perforating, fracing, and/or production stimulation in a wellbore without having to perform fracing, and/or production stimulation in areas which are not appropriate for fracing, and/or production stimulation, such as areas wherein an environmental, economic, or safety hazard exists.

In one or more embodiments, a textual report regarding areas appropriate and not appropriate for fracing, and/or production stimulation can be produced. This textual report can be presented in the executive dashboard along with the highlighted portions in the wellbore profile, and can be used in combination with the highlighted portions of the wellbore profile for determinations and communications.

Turning to the Figures, FIG. 1 is a schematic representation of a drilling rig 300 for horizontal, lateral, and directional drilling, wherein drilling operations is adjustable in real time, with an ability to change direction to stay on target in the wellbore.

The drilling rig has a controller 2 is operatively connected to a geo-steering system 330 such as through the network 65 for controlling rig drilling functions.

The controller functions to collect wellbore data from a tool 314 connected to the drill string 308 in the wellbore 3.

The geo-steering system 330 has a geo-steering processor 6 with data storage 7 to analyze in real time the data 9a from the rig to the geo-steering processor and to transmit data 9b from the geo-steering processor to the drilling rig.

The processor 6 can be in communication with the network 65. The network 65 can be in communication with one or more client devices, here shown including client device 67a and client device 67b. Client device 67a is shown associated with a first user 56a, while client device 67b is shown associated with a second user 56b. Each client device 67a and 67b has a display 8a and 8b, for presenting the executive dashboard, shown as executive dashboard 26a and executive dashboard 26b.

The processor 6 can be in communication with directional drilling equipment 4 for steering a drill bit 10 in the wellbore 3. The drill bit 10 can be connected to a drill string 308.

The drill string 308 can have a tool 314 connected therewith. The tool 314 can be integrated with, attached with, formed into, or otherwise connected with the drill string 308. The tool 314 can include one or more sensors 315.

In operation, the processor 6 can receive data 9a from the directional drilling equipment 4 concerning a current status of the drilling. The processor 6 can store this received data 9a in the data storage 7 and can present this data 9a in various forms to the client devices 67a and 67b in the executive dashboards 26a and 26b. The processor 6 can send data and/or commands 9b to the directional drilling equipment 4.

The processor 6 can also receive additional data from other sources, including data that is input by users or data from additional data storages, such as second data storage 16, a third data storage 19 or a fourth data storage 20. The third data storage can include a WITSEND™ software product available from Selman and Associates, Ltd., of Midland, Tex. for analysis of all wellbore data, all storage data or otherwise. The fourth data storage can contain a WITSML™ software that facilitates data transmission and delivery using known international standards of the oil and natural gas industry.

The executive dashboards 26a and 26b can present this additional data along with the received data 9a to the users 56a and 56b. The processor 6 can use the received data 9a and additional data to perform calculations and to make determinations associated with the drilling process.

The executive dashboards 26a and 26b can allow the users 56a and 56b to analyze the received data 9a and the additional data, and to provide control commands using control buttons on the executive dashboards 26a and 26b.

In embodiments, control commands can be performed by one user on the executive dashboard that can be seen by all user's viewing the executive dashboard.

A depth 221 for a formation 302 with a formation dipping away from the perpendicular angle 21 and a formation dipping toward the perpendicular angle 23 is depicted. A projected path 12 of the drill bit 10 is depicted passing through the formation 302. Also, a distance to the next formation 72 is shown.

A surface 5 of the wellbore 3 is depicted with a kelly bushing 31 of a drilling rig 300. A perpendicular angle 28 can be computed from the kelly bushing 31.

A horizontal plane 29 representing the surface 5 where the wellbore 3 is drilled along with the perpendicular angle 28 from the horizontal plane 29 can be used to determine the true vertical depth 27 (TVD) of the wellbore 3.

The network 65 can be in communication with multidimensional simulation in the data storage 318. The multidimensional simulation can allow a user to select a dimensional plot of the operation of the drill rig, allowing the drilling rig to adjust drilling in real time, with an ability to change direction and to stay on target in the wellbore within 3 to 12 hours.

The processor 6 can receive one or more signals 362 from the network 65. The signals 362 can transmit data collected by the tool 314 to the geo-steering system 330 for storage in the data storage 7.

The processor 6 can send encrypted signals to the drill rig 300. For example, a controller 2 in communication with the drill rig 300 can receive the encrypted signals.

The drill rig can include sub structure 301. The substructure 301 can have a base 302. A mast or derrick 303 can be supported by the base. A pipe handler 304 can be connected with the sub structure 301.

One or more mud pumps 305 can be in fluid communication with the wellbore 3. A draw works 306 can be connected with the mast or derrick 310. The draw works 306 can be connected with cabling 310 that can also be connected with a top drive supported by the derrick 310, allowing the draw works to control the movement of the drill string 308 relative to the wellbore.

Piping 309 can be used to provide fluid communication between the directional drilling equipment 4, the mud pumps 305, or combinations thereof with the wellbore 3.

A power source 311 can provide power for driving the directional drilling equipment 4, the mud pumps 305, the draw works 306, or combinations thereof.

A blow out preventer 312 can be operatively connected with the wellbore 3.

Figure 2:
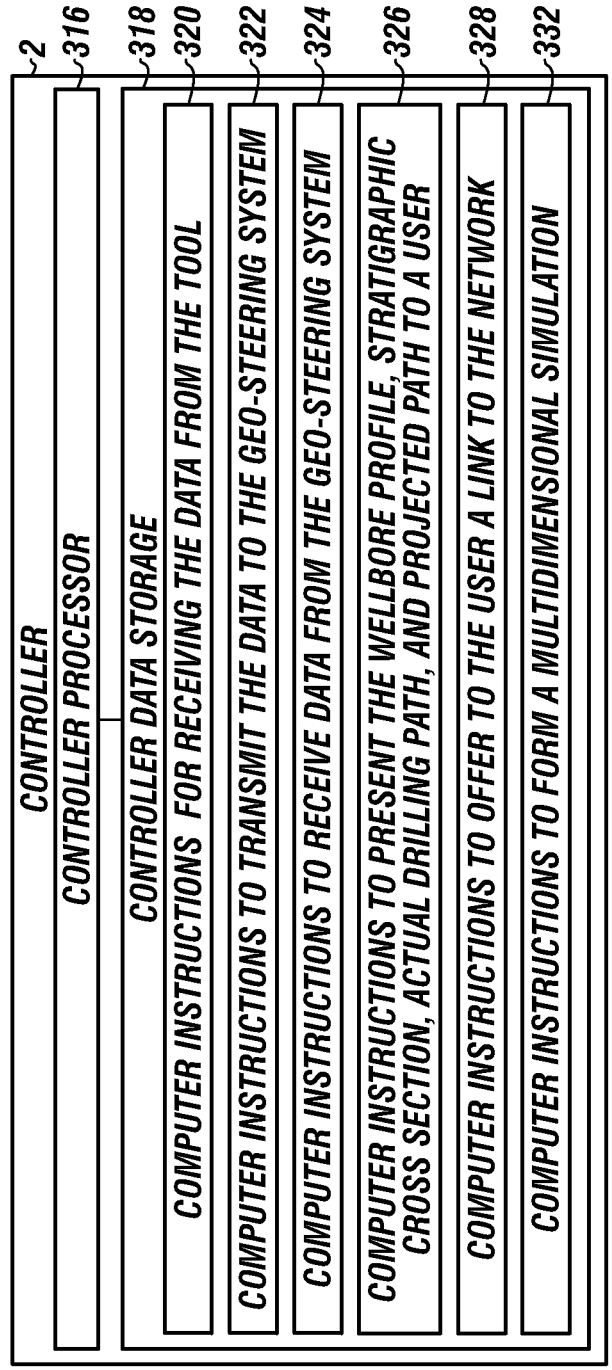
FIG. 2 is a diagram of the controller of the drilling rig that communicates with the geo-steering system.

FIG. 2 is a diagram of the controller of the drilling rig that communicates with the geo-steering computer instructions.

The controller 2 can include the controller processor 316, and the controller processor 316 can be in communication with the controller data storage 318.

The controller data storage 318 can include computer instructions 320 for receiving the data from the tool.

The controller data storage 318 can also include controller computer instructions 322 to transmit the data to the geo-steering system.

The controller data storage 318 can also include controller computer instructions 324 receive data from the geo-steering system.

The controller data storage 318 can also include controller computer instructions 326 to present the wellbore profile, stratigraphic cross section, actual drilling path, and projected path to a user on the drilling rig.

The controller data storage 318 can also include controller computer instructions 328 for to the user a link to the network 65.

The controller data storage 318 can include computer instructions to create a multidimensional simulation 332. The multidimensional simulation can allow a user to select a dimensional plot of the operation of the drill rig, allowing the drilling rig to adjust drilling in real time, with an ability to change direction and to stay on target in the wellbore within 3 to 12 hours.

Figure 3:
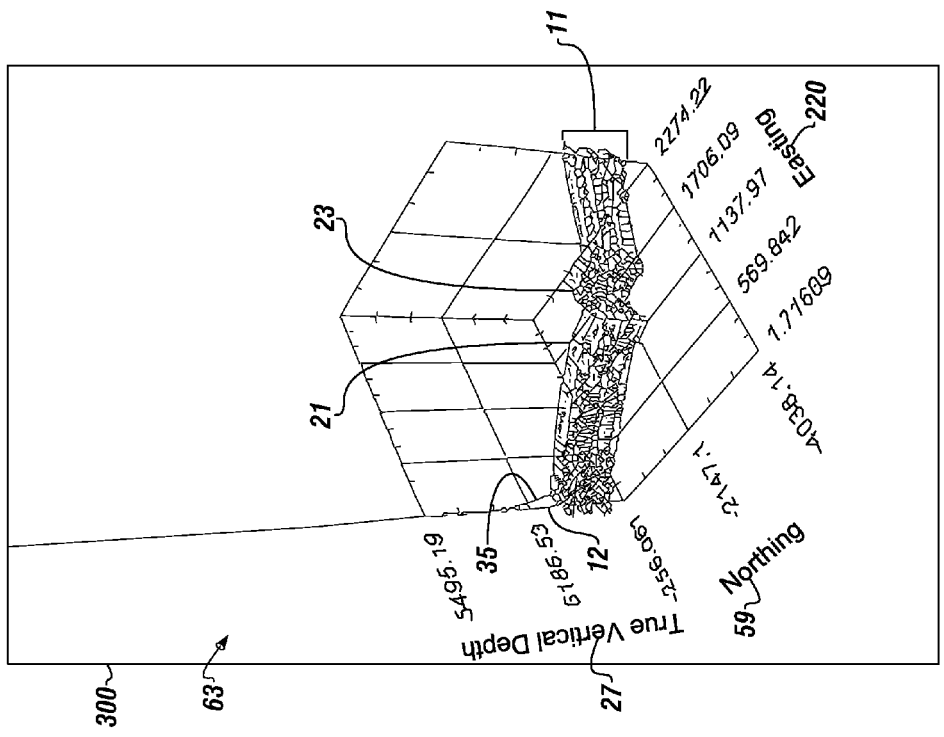
FIG. 3 is a detailed multi-dimensional simulation of a 3D graph, usable with the geo-steering system.

FIG. 3 is a detailed of a three dimensional plot of the multidimensional simulation which is produced using the geo-steering system.

The multi-dimensional simulation 300 can display a first formation. The first formation can dip away from a perpendicular angle 21. The multi-dimensional simulation 300 can display a second formation that dips toward the perpendicular angle 23.

The formations are displayed on a three dimensional plot 63. The three dimensional plot 63 can include northing 59 as the "y" axis, easting 220 as the "x" axis, and true vertical depth 27 as the "z" axis.

Each portion of the executive dashboard with the multidimensional simulation can be presented simultaneously to a plurality of users with client devices over a network, providing for constant monitoring and increased safety during drilling operations.

Also shown is the stratigraphic cross section 11.

The actual drilling path 35 and the projected drilling path 12 are also depicted.

Figure 4:
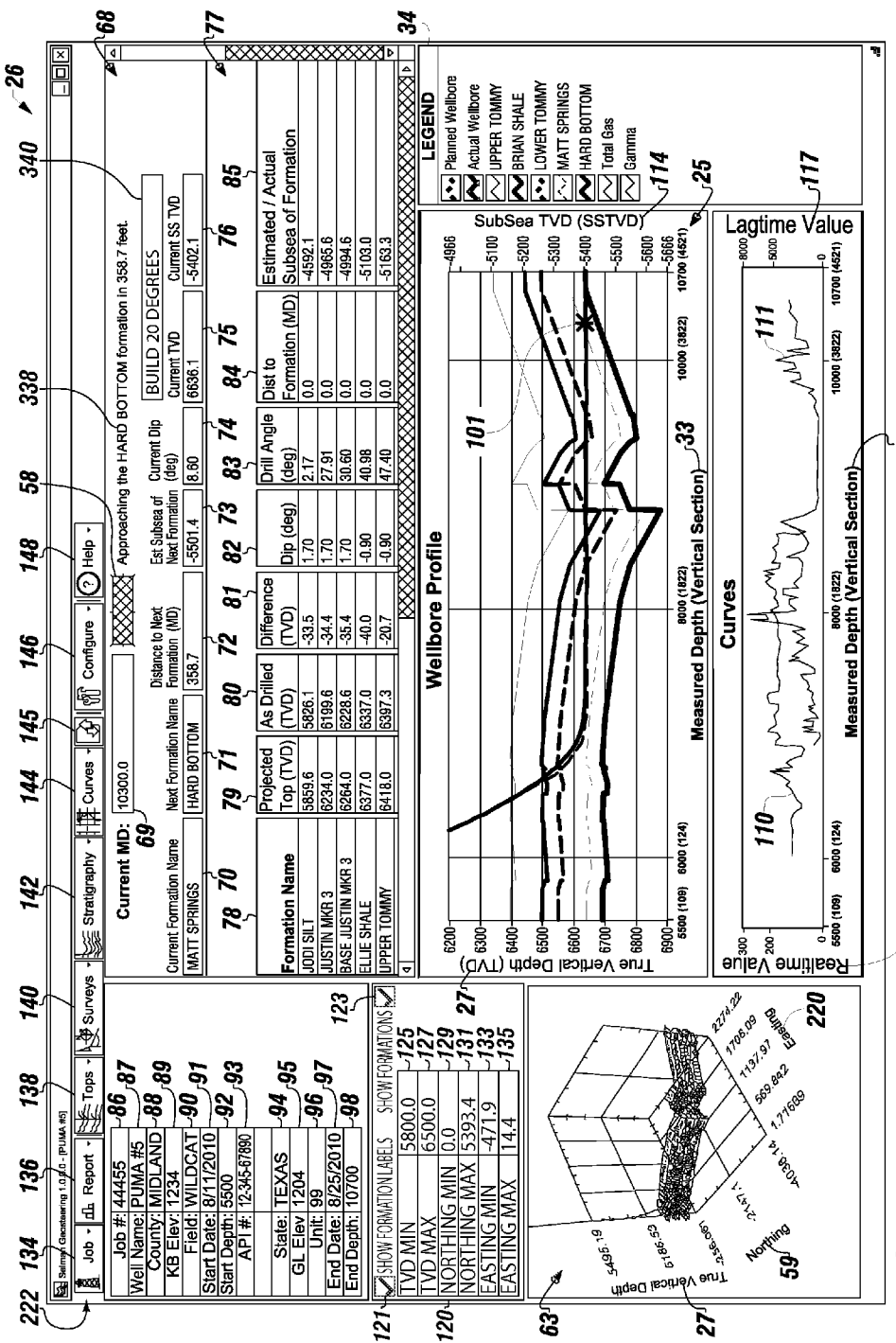
FIG. 4 is an executive board for the geo-steering system.

FIG. 4 depicts an embodiment of the executive dashboard 26 of the system for geo-steering during directional drilling.

The executive dashboard 26 can be a composite visualization that presents a wellbore profile 25. The wellbore profile 25 can include true vertical depths (TVD) 27 and for subsea drilling, a subsea true vertical depths (SSTVD) 114. Both true vertical depths are plotted with respect to measured depths 33.

The actual location of the drill bit 101 can also be seen in the wellbore profile 25.

The true vertical depths 27 for the wellbore profile 25 are shown here ranging from 6,200 feet to 6,900 feet. The measured depths 33 of the wellbore profile 25 is shown here ranging from 5,500 feet to 10,700 feet. The subsea true vertical depths 114 of the wellbore profile are shown here ranging from −4,966 feet to −5,666 feet. Any variation of feet for a given formation can be used.

The executive dashboard 26 can include a toolbar 222 located at a top of the executive dashboard. The toolbar 222 can include a job management menu 134 that allows a user to choose at least one of the following options: new, open from local database, open from file, close, edit job information, save/export job to file, import and/load job file to local database, backup local database, and exit program.

The toolbar 222 can include a report generation menu 136 that allows the user to choose at least one of the following options: create a PDF report or create a rich text format report (RTF report) and select additional report options.

The toolbar 222 can include a tops button 138 that can produce a drop down menu allowing the user to edit a type log tops and edit a prognosed tops table.

The toolbar 222 can include a survey button 140 that allows the user to choose at least one of the following: edit a planned survey or edit an actual survey. For example, a planned survey can include the kick off point for a proposed wellbore, a landing point for the proposed wellbore, and a target true vertical depth for the proposed wellbore.

The toolbar can include a stratigraphy button 142 that permits the user to edit stratigraphy adjustments to adjust the fitting/correlation of the actual curve, such as a gamma ray curve 110 and total gas curve 111, to a type log curve 103, such as a type log gamma ray curve. The stratigraphy button 142 allows editing of the estimated formation structure map by a user.

The toolbar 222 can include a curve button 144 that enables the user to perform editing of continuous curves used in the wellbore profile 25, such as the gamma curve 110 and the total gas curve 111. For example, the user can add values versus measured depths in a table that produces the continuous curves of the wellbore profile.

The toolbar 222 can include an update button 145 that allows the user to update data from data sources which includes information from the data storage 16, 19, and 20 in a synchronized manner.

The toolbar 222 can include a configure button 146 that allows the user to select at least one of the following: formation to configure, curve to configure, data source to reference for mapping, a map for inserting data from a selected data source, alarm to configure, view a quantity of days left on a license key of an analytic tool usable for well bore profiling, and view information on the validity of a license key. For example, the user can select the formation option and can then configure a formation set of data by adding formations to the formation set, removing one or more formations from the formation set, configuring line styles, line thicknesses, and line colors of formations in the formation set, or combinations thereof.

The toolbar 222 can include a help button 148 that allows the user to type questions and receive answers based on key words within the user's questions.

The executive dashboard 26 can display report header information, including: a job number 86 shown as 44455; a well name or number 87, shown as PUMA #5; a county 88, shown as Midland; a kelly bushing elevation 89, shown as 1234; a field name 90, shown as WILDCAT; a start date for drilling 91, shown as 8/11/2010; a start depth for drilling 92, shown as 5500 feet; an American Petroleum Institute (API) number 93, shown as 12-345-67890 which is a unique number for a well drilled in the United States; a state in which the drilling occurs 94, shown as Texas; a ground level elevation 95, shown as 1204; a unit number 96, shown as having a value 99; an end date of drilling 97, shown as 8/25/2010; and an end depth of the drilling 98, shown as 10700 feet. Additional report elements 120 can also be shown.

FIG. 4 shows a detail of the additional report elements 120 which include show formation labels check box 121; show formations check box 123; minimum true vertical depth (TVD) scale control 125; maximum true vertical depth scale control 127; minimum northing scale control 129; a maximum northing scale control 131; a minimum easting scale control 133; a maximum easting scale control 135; and combinations thereof.

The executive dashboard 26 can include current information 68, which can include: a current measured depth 69, shown as 10300.0 feet; a current formation name 70, such as MATT SPRINGS; a next formation name 71, such as HARD BOTTOM; a distance to next formation 72, show as 358.7 feet; an estimated subsea depth of next formation 73, shown as −5501.4 feet; a current dip angle of the formation 74 shown as 8.60 degrees; a current true vertical depth 75, shown as 6636.1 feet; and a current subsea true vertical depth 76, shown as −5402.1 feet.

The executive dashboard 26 can include a formation transition report 77, which can include: at least one formation name 78, such as UPPER TOMMY; at least one projected formation top 79 of the formation associated with the formation name, such as 6418.0; at least one true vertical depth as drilled 80, shown as 6397.3; at least one difference 81 between a projected formation top and an as drilled top, shown as −20.7; at least one dip 82 for a top of a formation as drilled, shown as −0.90; at least one drilled angle 83 of the wellbore at a top of a formation, shown as 47.40; at least one distance to formation 84, shown as 0.0; and at least one estimated/actual subsea formation depth 85 relative to sea level for a top of a formation, shown as −5163.3. The distance to formation 84 can be a distance to the next formation or a distance to a selected formation.

The executive dashboard 26 can include a legend 34 which identifies the planned wellbore curve, the actual wellbore curve, formation names, a total gas curve, and a gamma ray curve.

The gamma ray curve 110 can be formed by plotting a real-time value 115, here shown with a range from 0 to 300, against the measured depths 33 of the wellbore, here shown ranging from 5500 feet to 10700 feet.

The total gas curves 111 can be formed by plotting a lag time value 117, shown as ranging from 0 to 8000, against the measured depths 33 of the wellbore.

The executive dashboard 26 can present a three dimensional plot 63 of a projected path for a drill bit simultaneously as superimposed over the stratigraphic cross section 11 (which is shown in FIG. 4).

The three dimensional plot 63 includes northing 59 as the "y" axis, easting 220 as the "x" axis, and true vertical depth 27 as the "z" axis.

Each portion of the executive dashboard 26 can be presented simultaneously to a plurality of users with client devices over a network, providing for constant monitoring and increased safety during drilling operations.

In an embodiment, it is contemplated that the information for the executive dashboard can be updated with only two clicks, based on events. If the events occur quickly, then the dashboard can be updated in only a few seconds, such as 3 to 5 seconds, or updated daily if the gamma ray is only updated daily. If the user is connected to streaming gamma ray, then the updating can be automatically without clicking, every three to five sections.

The graphic wellbore profile of the dashboard can be updated in seconds with the system. In an embodiment it can take 10 seconds to 1 minute to perform configurations of the curve, and the fitting the curve to be outside of a target zone.

In an embodiment, the system can show the information in color for fast understanding. Namely, the graphic representations can show the tops for the formations as green markers, the bottom of the target formation can be red, particular named formations such "Eagleford Shale" can be color coded blue or yellow, brown, black, and the curves for the well bore path can be dashed lines, or solid lines, the wellbore path can change color as the wellbore path passes through specific formations. A hot gamma ray path can be red, and a cold gamma ray path can be blue to easily identify the hot zone versus the cold zone.

An alarm 58 is shown as a "red flag area" indicated on the executive dashboard 26. The alarm 58 can inform the user that the drill bit is about to enter dangerous territory and should be realigned. The alarm 58 can be formed from computer instructions 348 (shown in FIG. 5) that transmit an alarm when the data from the actual drill bit location exceeds or does not meet preprogrammed levels.

Figure 5:
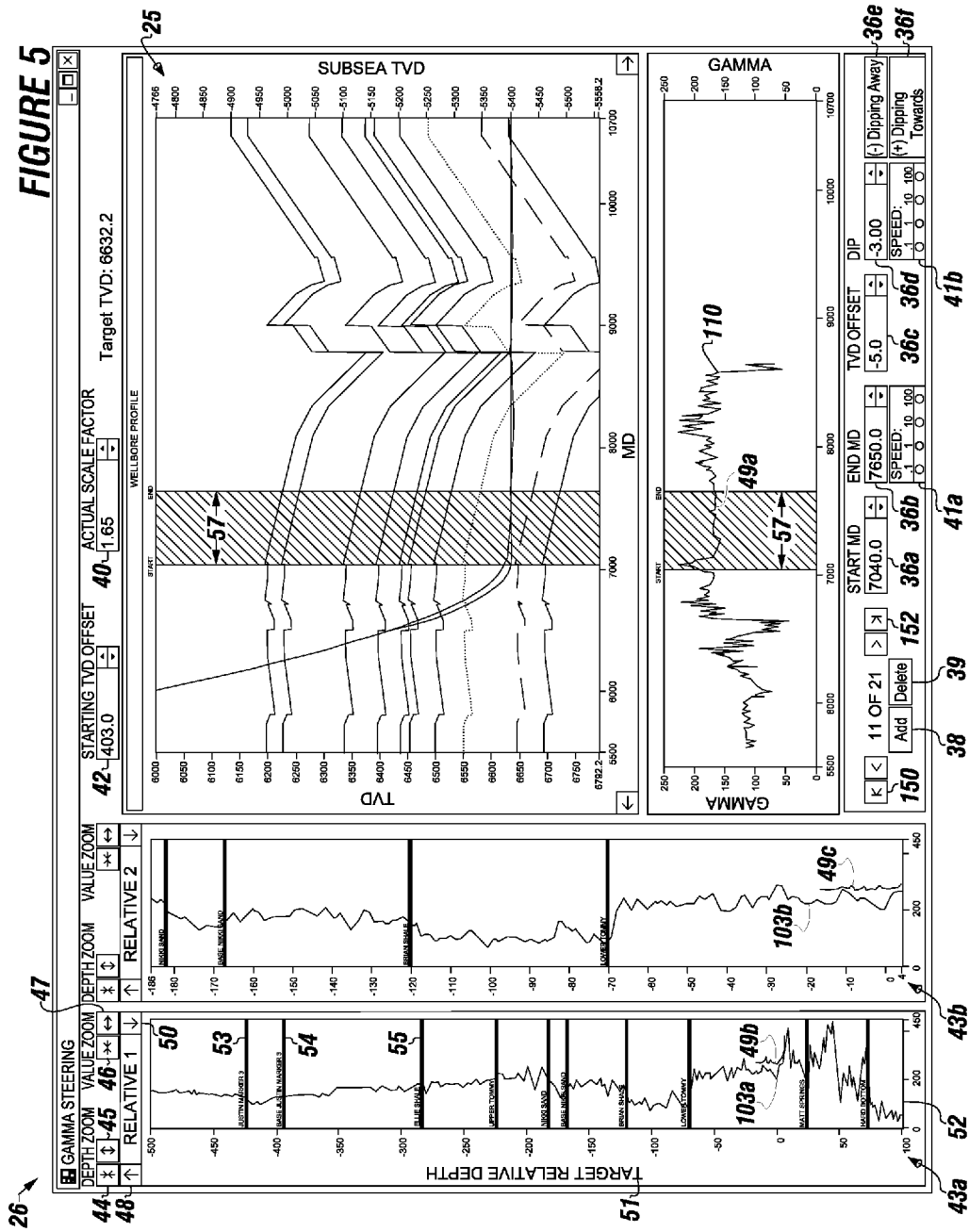
FIG. 5 is an executive dashboard of a stratigraphic cross section with two relative matching graphs.

The executive dashboard 26 can display generated text 338. The generated text 338 can display warning information. The executive dashboard 26 can also display a text recommendation 340. The text recommendation 340 can instruct a user to change drilling direction by degrees of azimuth, degree of inclination, or combinations thereof FIG. 5 depicts an embodiment of an executive dashboard 26 with a plurality of control buttons that can be presented to a user to manipulate, such as by clicking a mouse over the buttons.

The control buttons can include: a control button 36a to manipulate a start measured depth, a control button 36b to manipulate an ending measured depth, a control button 36c to manipulate a true vertical depth offset, and a control button 36d to manipulate a dip or dip angle in degrees. For example, the user can increase values, decrease values, or replace a value with a new value using the control buttons.

A first indicator 36e to identify dipping away from the projected path of the drill bit, and a second indicator 36f to identify dipping towards the projected path of the drill bit are also depicted.

Additional navigation controls can be presented to the user, including a first navigation control 150 for moving the portion of interest in the stratigraphic section in a first direction along the stratigraphic cross section, and a second navigation control 152 for moving portion of interest in the stratigraphic section 57 in a second direction along the stratigraphic cross section. In one or more embodiments, the navigation controls can have "double" arrows for moving a user to the end or start of a stratigraphic cross section.

The executive dashboard 26 can have additional buttons 44, 45, 46, 47, 48, and 50 that can be used to manipulate a first relative matching graph 43a and a second relative matching graph 43b.

The additional control buttons include an actual scale factor button 40 that can be used to increase or decrease a scale value of the actual curves for both of the relative matching graphs, such as the gamma ray curves and the total gas curves.

The executive dashboard 26 can include a control button 42 to set, change, increase, or decrease a starting true vertical depth offset of a type log curve for both of the relative matching graphs.

The additional controls for the relative matching graph 43a can include a control button 44 for each of the relative matching graphs that can be used for depth zoom-in and a control button 45 for each of the relative matching graphs that can be used for depth zoom-out. For example, a user can use a depth zoom-in to examine the curve values in more detail to achieve a better or desired curve fit.

A control button 46 for each of the relative matching graphs that can be used for value zoom-in, a control button 47 for each of the relative matching graphs that can be used for value zoom-out, and a control button 48 for each of the relative matching graphs that can be used to scroll up along the relative matching graph 43a. For example, a user can use a value zoom-out button to examine the curve from a macro perspective rather than in detail.

A control button 50 for each of the relative matching graphs is also used to scroll down along the relative matching graph 43a. For example, the user can use control button 50 to view different portions of the relative graph. The relative matching graph 43b can have the same additional control buttons, which are not labeled in this figure.

The relative matching graphs can be formed by plotting the target relative depth scale 51 versus the value scale 52. The target relative depth scale 51 can be a true vertical depth scale that is relative to the target true vertical depth. For example, if the target true vertical depth is 6632 feet, this target true vertical depth can be set as a zero on the target relative depth scale 51, such that a value of −100 feet on the target relative depth scale 51 would represent 6532 feet in terms of true vertical depth, and a value of 50 feet on the target relative depth scale 51 would represent 6682 feet in terms of true vertical depth. The value scale 52 can be a real-time value of the actual curves and type log curves, such as the gamma ray curves and other curves.

The relative matching graph 43a can include: the first formation/marker top 53, the second formation/marker top 54, and the third formation/marker top 55. In operation, a user can use the two relative matching graphs to view two separate views of the actual curve overlaid onto the type log curve, thereby simultaneously viewing a macro and a micro view of the curve fit.

The executive dashboard 26 can include additional control buttons, which can be disposed below the plot of the actual curves, such as the gamma rays curve 110, which are disposed below the wellbore profile 25. For example, the executive dashboard 26 can include a control button 38 to add a stratigraphic section to the wellbore profile, and control button 39 to delete a stratigraphic section to the wellbore profile. For example, the user can add a stratigraphic section representing the measured depths of the wellbore starting at 7040 feet and ending at 7650 feet to the wellbore profile 25. The executive dashboard 26 can include a control button to set speed control 41a for depth and a control button speed control 41b for dip, which can each be used to adjust a rate of change of the other controls of the executive dashboard 26.

The wellbore profile 25 and the plot of the actual curves, such as the gamma ray curve 110, can include a portion of interest in the stratigraphic section 57. A portion of the actual curve 49a within the portion of interest in the stratigraphic section 57 can be plotted within each of the relative matching graphs 43a and 43b, shown as 49b and 49c, along with the type log curves 103a and 103b.

In operation, the user can add stratigraphic sections using the control buttons. Then, for each stratigraphic section, the user can adjust a width of the portion of interest in the stratigraphic section 57. Then, for each stratigraphic section, the user can then adjust true vertical depth offset and the dip or dip angle using the control buttons such that the actual curve overlays the type log curve to achieve the highest degree of fit/correlation between the two curves as is possible. Adjusting the true vertical depth offset in the actual curve changes the vertical shift of the actual curve as plotted. Adjusting the dip or dip angle of the actual curve changes the thickness, shape, and direction of the actual curve as plotted.

Also shown is gamma ray curve 110.

FIGS. 6A-6F are a representation of the data storage of the system.

FIG. 6A shows that the data storage 7 can include computer instructions 600 to instruct the processor to create an executive dashboard and to continuously present the executive dashboard on a display to a user in real-time.

The data storage 7 can include computer instructions 602 to instruct the processor to identify a projected path in the dashboard simultaneously in two dimensions and three dimensions, for the drilling bit during directional drilling, and to store the projected path in the data storage.

The data storage 7 can include computer instructions 604 to instruct the processor to import data, to the dashboard, including a plurality of offset/type tops of a projected formation through which the projected path will follow, from a second data storage to an offset/type table.

The data storage 7 can include computer instructions 606 to instruct the processor to import data to the dashboard, including an actual survey of the wellbore from the second data storage, a third data storage, or combinations thereof, into the data storage.

The data storage 7 can include computer instructions 608 to instruct the processor to import data to the dashboard, including a geological prognosis from the second data storage, third data storage, a fourth data storage, or combinations thereof to a prognosed tops table into the data storage.

The data storage 7 can include computer instructions 610 to instruct the processor to compute a wellbore profile for display on the dashboard using the imported data, wherein the wellbore profile is a composite visualization of a plurality of true vertical depths, and to compute the stratigraphic cross section for the wellbore profile.

The data storage 7 can include computer instructions 612 to instruct the processor to plot an actual drilling path for display on the dashboard using the actual survey.

The data storage 7 can include computer instructions 614 to instruct the processor to overlay the actual drilling path onto the projected path in the stratigraphic cross section in the wellbore profile, for display on the dashboard, thereby enabling a real-time and moment-by-moment updating of the actual drilling path over the projected path for the drill bit. A user can therefore view the actual drilling path and the projected drilling path in the executive dashboard.

The data storage 7 can include computer instructions 616 to instruct the processor to present control buttons to the user on the executive dashboard enabling the user to increase or decrease, for at least one portion of the stratigraphic cross section, each member of the group consisting of: a start measured depth, an ending measured depth, a true vertical depths offset, and a dip.

FIG. 6B is a continuation of FIG. 6A. The data storage 7 can include computer instructions 617 to instruct the processor to enable the user to increase or decrease values associated with each control button to modify: the start measured depth, the ending measured depth, the true vertical depths offset, the dip, or combinations thereof, on portions of the stratigraphic cross section to correctly identify a location of the drill bit in the stratigraphic cross section.

The data storage 7 can include computer instructions 618 to instruct the processor to compute the true vertical depths as measured at the perpendicular angle from the horizontal plane representing the surface surrounding the wellbore using measured depths, inclinations, and azimuths; to plot the true vertical depths versus the measured depths of the drill bit; and to present the plotted true vertical depths versus the measured depths within the wellbore profile in the executive dashboard.

One or more embodiments can include one or more control buttons that control rates of speed for one or more other controls. For example, the data storage 7 can include computer instructions 620 to instruct the processor to present a first speed control button in the executive dashboard to control a rate of adjustment for control buttons, and a second speed control button to control a rate of adjustment for control buttons.

The data storage 7 can include computer instructions 622 to instruct the processor to transmit an alarm if continued drilling in a formation: will violate a permit.

The data storage 7 can include computer instructions 624 to instruct the processor to superimpose the projected path for the drill bit over a formation structure map to determine faults through which the projected path will pass.

The data storage 7 can include computer instructions 626 to instruct the processor to superimpose the projected path for the drill bit over the stratigraphic cross section to determine specific next formations through which the projected path will pass.

The data storage 7 can include computer instructions 628 to instruct the processor to form a report of the projected path and the actual drilling path, and to present the report of the projected path and the actual drilling path in the executive dashboard to be viewed in real-time by a plurality of users simultaneously.

The data storage 7 can include computer instructions 630 to instruct the processor to form a report of past drilling data and planned drilling actions associated with the executive dashboard.

The data storage 7 can include computer instructions 632 to instruct the processor to display in the executive dashboard an actual location of the drill bit on the actual drilling path for instantaneous identification of the drill bit during horizontal drilling.

FIG. 6C is a continuation of FIG. 6B. The data storage 7 can include computer instructions 634 to instruct the processor to use a surface elevation or a rotary table bushing elevation of a surface for a start of a bore hole and at least one offset/type tops of the projected formation to generate the geological prognosis.

The data storage 7 can include computer instructions 636 to instruct the processor to use type log tops from a vertical well proximate the wellbore to calculate thicknesses of formations, thicknesses of rock between formations, other geological features, or combinations thereof. The vertical well proximate the wellbore can be used as a reference point to represent geological features of the area proximate the wellbore, such as thicknesses of formations and thicknesses of rock between formations.

The data storage 7 can include computer instructions 638 to instruct the processor to generate the projected path by calculating the projected path using a kick off point, a build rate, a landing point, and a target angle. The kick off point can be the portion of the wellbore wherein the horizontal drilling begins. The build rate can be the rate of change of inclination of the wellbore to reach the landing point. The landing point can be the point at which the wellbore reaches a target depth. The target angle can be the angle of inclination of the wellbore as it extends from the landing point.

The data storage 7 can include computer instructions 640 to instruct the processor to provide correlation points for at least one actual curve or at least one point along an actual curve of the stratigraphic cross section, wherein each correlation point is tied to a known type log curve for confirming accuracy of the actual curve, accuracy of a fit of the actual curve to the known type log curve, or combinations thereof.

The data storage 7 can include computer instructions 642 to instruct the processor to provide correlation points for at least one actual curve or at least one point along an actual curve of the stratigraphic cross section to allow the user to thicken or thin each actual curve of the stratigraphic cross section to fit a known type log curve.

The data storage 7 can include computer instructions 644 to instruct the processor to present the projected path in the executive dashboard simultaneously in two dimensions and in three dimensions. The three dimensional presentation of the projected path includes an overlay of an ownership map for the land and a seismic image projected into the three dimensional presentation. The ownership map can be used to determine whether or not the actual drilling path and the projected path are within identified land ownership/lease boundaries.

The data storage 7 can include computer instructions 646 to instruct the processor to store data received from the directional drilling equipment within the data storage.

The data storage 7 can include computer instructions 648 to instruct the processor to communicate over a network and to import the plurality of offset/type tops of the projected formation through which the projected path will follow.

The data storage 7 can include computer instructions 650 to instruct the processor to save the wellbore profile in the data storage.

The data storage 7 can include computer instructions 652 to instruct the processor to transmit the wellbore profile to the display.

The data storage 7 can include computer instructions 654 to instruct the processor to compute a "distance to next formation" using the measured depth from the current formation.

FIG. 6D is a continuation of FIG. 6C. The data storage 7 can include computer instructions 656 to instruct the processor to use an estimated true vertical depth of the next formation and a kelly bushing elevation to compute an "estimated subsea depth of next formation."

The data storage 7 can include computer instructions 658 to instruct the processor to determine a "current dip."

The data storage 7 can include computer instructions 660 to instruct the processor to calculate a "current true vertical depth."

The data storage 7 can include computer instructions 662 to instruct the processor to present the reports to the user in addition to and simultaneously with the executive dashboard.

The data storage 7 can include computer instructions 664 to instruct the processor to configure the executive dashboard to allow users to highlight portions of the wellbore profile.

The data storage 7 can include computer instructions 666 to instruct the processor to plot an actual curve and to plot a type log curve for use within the same graph.

The data storage 7 can include computer instructions 668 to instruct the processor to form a plot of a portion of the actual curve within the portion of interest in the stratigraphic section versus the target relative depth scale.

The calculation used to plot the portion of the actual curve within the portion of interest in the stratigraphic section versus the target relative depth scale can include as factors: the true vertical depths of the wellbore that passes through the stratigraphic section, as well as any formation dips and/or faults that occur in the stratigraphic section. For example, the plot of the portion of the actual curve within the portion of interest in the stratigraphic section versus the target relative depth scale can be calculated using a plurality of sampling data points along the portion of the actual curve having a measured depth and an actual value.

The data storage 7 contains computer instructions 670 to instruct the processor to calculate a change in true vertical depth due to a dip. The calculation of the change in true vertical depth due to the dip can be performed by multiplying the tangent of the negation of the dip angle (DA) for the stratigraphic section with the absolute value of the difference in the measured depth (MD) and the starting measured depth (SMD) of the stratigraphic section, that is, tan(-DA)×|MD-SMD|.

The data storage 7 can include computer instructions 672 to instruct the processor to calculate the true vertical depth at the starting measured depth for the stratigraphic section using the actual survey stored in the data storage. The calculation of the true vertical depth at the starting measured depth for the stratigraphic section using the actual survey stored in the data storage can also be performed using the computer instructions 660, but using a measured depth other than the current measured depth.

The data storage 7 can include computer instructions 674 to instruct the processor to calculate the true vertical depth at the measured depth of the data point along the actual curve using the actual survey within the data storage. The calculation of the true vertical depth at the measured depth at the data point along the actual curve using the actual survey within the data storage can be performed using the computer instructions 660.

The data storage 7 can include computer instructions 676 to instruct the processor to calculate a change in the true vertical depth due to a change in true vertical depth in the actual survey by determining a difference between the true vertical depth at the starting measured depth and the true vertical depth at the measured depth at the data point along the actual curve.

FIG. 6E is a continuation of FIG. 6D. The data storage 7 can include computer instructions 678 to instruct the processor to calculate a change in target relative depth by performing a summation of the change in true vertical depth due to dip and the change in true vertical depth due to the change in true vertical depth in the actual survey.

The data storage 7 can include computer instructions 680 to instruct the processor to calculate an "X" axis value for the plot of the portion of the actual curve within the portion of interest in the stratigraphic section versus the target relative depth scale by multiplying an actual value of the data point with an actual scale factor.

The actual scale factor can be set by a user using the control buttons in the executive dashboard.

The data storage 7 can include computer instructions 682 to instruct the processor to calculate a "Y" axis value for the plot of the portion of the actual curve within the portion of interest in the stratigraphic section versus the target relative depth scale by determining a difference between the starting target relative depth of the stratigraphic section and the change in target relative depth, and then subtract the true vertical depth shift from the determined difference.

The true vertical depth shift can be set by a user using the control buttons in the executive dashboard.

The data storage 7 can include computer instructions 684 to instruct the processor to plot the stratigraphic cross section.

The data storage 7 can include computer instructions 686 to instruct the processor to calculate the stratigraphic cross section consisting of multiple curves representing tops of formations through which the wellbore has traversed or is expected to traverse.

In one or more embodiments, the multiple curves can represent formations through which the wellbore is expected not to traverse.

The data storage 7 can include computer instructions 688 to instruct the processor to plot curves for each formation in the stratigraphic cross section using: the true vertical depth offsets, the starting measured depth, the ending measured depth, the dip, and thicknesses from the offset/type tops table.

The data storage 7 can include computer instructions 690 to instruct the processor to determine two points along the plotted curves for each formation in the stratigraphic cross section, wherein a first point represents a starting point for a portion of the plotted curve, and a second point represents an ending point for the portion of the plotted curve, and wherein the portion of the plotted curve represents a formation within the portion of interest in the stratigraphic section. The portion of the plotted curve can be the portion of interest in the stratigraphic section. The first point can have a first X-axis value and a first Y-axis value, and the second point can have a second X-axis value and a second Y-axis value.

The data storage 7 can include computer instructions 692 to instruct the processor to use an "X" axis value of the first point of a previous stratigraphic section as the starting measured depth for the current stratigraphic section.

The data storage 7 can include computer instructions 694 to instruct the processor to calculate a "Y" axis value of the first point by summing a "Y" axis value of a second point of a previous stratigraphic section and the true vertical depth offset a current stratigraphic section.

Figure 6F:
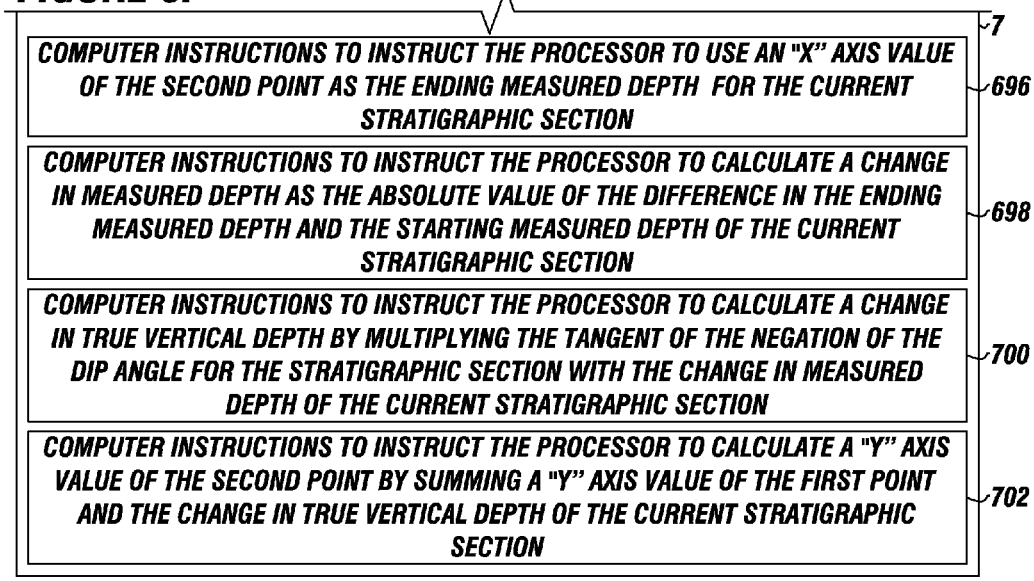

FIG. 6F is a continuation of FIG. 6E. The data storage 7 can include computer instructions 696 to instruct the processor to use an "X" axis value of the second point as the ending measured depth for the current stratigraphic section.

The data storage 7 can include computer instructions 698 to instruct the processor to calculate a change in measured depth as the absolute value of the difference in the ending measured depth and the starting measured depth of the current stratigraphic section.

The data storage 7 can include computer instructions 700 to instruct the processor to calculate a change in true vertical depth by multiplying the tangent of the negation of the dip angle for the stratigraphic section with the change in measured depth of the current stratigraphic section.

The data storage 7 can include computer instructions 702 to instruct the processor to calculate a "Y" axis value of the second point by summing a "Y" axis value of the first point and the change in true vertical depth of the current stratigraphic section. In one or more embodiment of the calculation performed by computer instructions 702, the current stratigraphic section can be replaced with the current portion of interest in the stratigraphic section.

FIG. 7 is presentation of a geological prognosis 22 usable in the invention. The geological prognosis 22 can include: header information 168, payzones 170, formation information 172, top depths of formations 174, base depths of formations 178, and a target line 180.

For example, the header information 168 can include information about the wellbore including contact information, identifying information for the wellbore, and other information. The payzones 170 can also be referred to as target objectives, project objectives, zones of interest, and formations of interest. The formation information 172 can include formation names, formation markers, markers, and annotated points of interest. The target line 180 can include the target true vertical depth, the target angle, and a range above and below the target depth forming a target zone. The top depths of formations 174 can be true vertical depths or measured depths. The base depths of formations 178 can be true vertical depths or measured depths.

FIG. 8 is a representation of an offset/type table 15 usable in the system, including a table identifier 181 that identifies the type log tops being stored in the offset/type table.

The offset/type table 15 can include rows and columns of data. A first column of data 182 can include a formation marker name. The first column of data 182 can include a plurality of offset/type tops of a projected formation, including offset/type top 14a, offset/type top 14d, offset/type top 14g, and offset/type top 14j.

The offset/type table 15 can include: top depths of formations column 184, such as depth 2110.0 feet for the Selman Sand formation.

The offset/type table 15 can include a true vertical depth tops column 186, which can be 3744.0 for the Midland Silt marker formation.

The offset/type table 15 can include a true vertical depths base column 188, such as 4850 for the Thomas SS formation.

The offset/type table 15 can include a subsea true vertical depth tops column 190, such as −4032 for the Brian market 1 formation.

Additionally the offset/type table 15 can include a subsea true vertical depth base column 192, such as −911.0 for the Selman Sand formation, and a thickness column 194, such as 264.0 for the Midland silt marker.

The offset/type table 15 can have a first selector button 191 that allows a user to enter a true vertical depth into the top depths of formations column 184. A second selector button 195 can allow a user to enter a subsea true vertical depth into the top depths of formations column 184.

The offset/type table 15 can have three storage buttons including a save and close button 193 that can be used to save data that has been edited in the table 15 to the data storage 7 of FIG. 1, and saves the presented template of the offset/type table 15, and can remove the offset/type table 15 from the display. A save button 197 can be used to save the data that has been edited in the offset/type table 15 to the data storage 7. A close button 199 can be used to close present a template of offset/type table 15, and to remove the template from the display.

FIG. 9 is a representation of an actual survey 18 usable in the system. The actual survey 18 can include: a measured depth 196; an inclination 198; an azimuth 200; a tool type 202; such as a gyroscope, a survey table name 204; a proposed azimuth 206, such as 149.0 degrees; a target angle 208, such as 90 degrees; a survey calculation method 210, such as the minimum curvature method; a target true vertical depth 212, such as 6632.2; an initial value true vertical depth 214; an initial value vertical section 216; a northing 59, and an easting 220.

As an example, in one or more embodiment of the actual survey 18, calculations will not be performed in the first line of the actual survey; rather, initial values will presented here, such as: starting points, the TVD is 5824.90, the vertical section, the northing, and the easting.

The actual survey 18 can include exemplary survey points. The exemplary survey points can include the measured depths at which the actual survey is being or has been conducted, such as at 5890 feet. The actual survey 18 can show that the survey is using a gyro tool, as depicted in the tool type 202 column. For example, the gyro tool can measure the inclination as 2.3 degrees from vertical, and the azimuth can be a compass direction at 172.8 degrees when at a depth of 5890 feet. The actual survey 18 can include a save and close button, a save button, and a close button which can function the same as those described for the offset/type table described herein.

Figure 10:
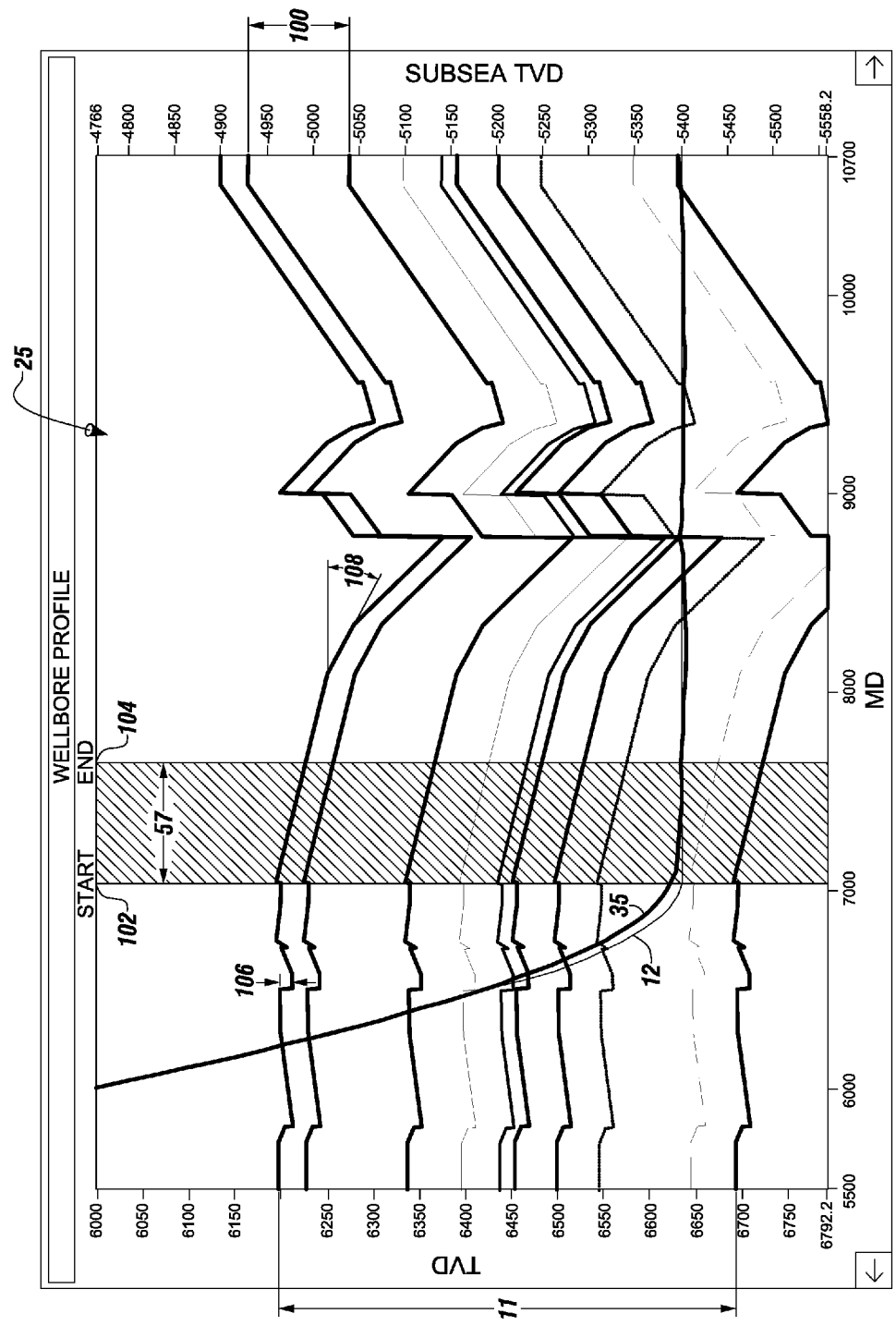
FIG. 10 is a detailed view of the stratigraphic cross section.

FIG. 10 is a detailed view of a stratigraphic cross section 11 for the wellbore profile 25. The stratigraphic cross section 11 can include: a projected path 12 for a drilling bit, an actual path 35 for the drilling bit, a true vertical depth offset 106 for the stratigraphic cross section of the wellbore, a dip angle 108 for the stratigraphic cross section, which is shown in this Figure as a dip away that is approximately a 30 degree angle.

The stratigraphic cross section 11 can include: one of the offset type tops sections 100 through which the projected path will follow, a starting measured depth 102 for a stratigraphic section 57 of the wellbore, and an ending measured depth 104 for the stratigraphic section 57.

The stratigraphic cross section 11 can display formations. The formations can be identified hydrocarbon bearing formations.

FIG. 11 depicts an embodiment of a prognosed tops table 24.

The prognosed tops table 24 can include the table identifier 181 that identifies the type log tops being stored in the prognosed tops table 24.

The prognosed tops table 24 can include rows and columns of data. A first column of data 182 that includes formation names 182. The first column of data 182 can include a plurality of offset/type tops of a projected formation, including offset/type top 14a, offset/type top 14d, offset/type top 14g, and offset/type top 14j.

The prognosed tops table 24 can include: top depths of formations column 184, such as depth 2110.0 feet for the Selman Sand formation.

The prognosed tops table 24 can include a true vertical depth tops column 186, which can be 3744.0 for the Midland Silt marker formation.

The prognosed tops table 24 can include a true vertical depths base column 188, such as 4850 for the Thomas SS formation.

The prognosed tops table 24 can include a subsea true vertical depth tops column 190, such as −4032 for the Brian market 1 formation.

Additionally the prognosed tops table 24 can include a subsea true vertical depth base column 192, such as −911.0 for the Selman Sand formation, and a thickness of formation column 194, such as 264.0 for the Midland silt marker.

The prognosed tops table 24 can have a first selector button 191 that allows a user to enter a true vertical depth into the top depths of formations column 184. A second selector button 195 can allow a user to enter a subsea true vertical depth into the top depths of formations column 184.

The prognosed tops table 24 can have three storage buttons including a save and close button 193 that can be used to save data that has been edited in the prognosed tops table to the data storage 7 of FIG. 1, and saves the presented template of the prognosed tops table, and can remove the prognosed tops table 24 from the display. A save button 197 can be used to save the data that has been edited in the prognosed tops table 24 to the data storage 7. A close button 199 can be used to close the prognosed tops table 24, and to remove the prognosed tops table from the display.

While these embodiments have been described with emphasis on the embodiments, it should be understood that within the scope of the appended claims, the embodiments might be practiced other than as specifically described herein.

What is claimed is:

1. A drilling rig for horizontal, lateral, and directional drilling, wherein drilling operations is adjustable in real time, with an ability to change direction to stay on target in a wellbore, wherein the drilling rig comprises:
   a. a sub structure;
   b. a base;
   c. a mast or derrick;
   d. a pipehandler;
   e. mud pumps;
   f. drawworks;
   g. a drill string;

h. a piping;

i. a cabling;

j. a power source;

k. directional drilling equipment;

l. a controller comprising a controller processor with controller data storage wherein the controller is operatively connected to a geo-steering system for controlling rig drilling functions by:
   (i) collecting wellbore data from a tool connected to the drill string in the wellbore; and
   (ii) transmitting the wellbore data collected to the system for geo-steering; and m. wherein the system for geo-steering performs the steps:
   (i) using a geo-steering processor to analyze the data in real time;
   (ii) identifying a projected path for the drill string during directional drilling, using the data and storing the projected path in a data storage;
   (iii) computing a wellbore profile using the data, wherein the wellbore profile is a composite visualization of a plurality of true vertical depths;
   (iv) computing a stratigraphic cross section for the wellbore profile, wherein the stratigraphic cross section comprises:
      1. a formation dipping away from an perpendicular angle to a horizontal plane representing a surface surrounding the wellbore;
      2. a formation dipping toward from the perpendicular angle to the horizontal plane representing the surface surrounding the wellbore; or
      3. combinations thereof; and
      wherein the stratigraphic cross section for the wellbore profile is computed and plotted using non-transitory computer readable medium containing computer instructions stored in the data storage to instruct the processor to:
      (a) calculate the stratigraphic cross section, wherein the stratigraphic cross section consists of multiple curves representing tops of formations through which the wellbore has traversed, is expected to traverse, is expected to not traverse, or combinations thereof;
      (b) plot curves for each formation in the stratigraphic cross section using: true vertical depth offsets from the portion of interest in the stratigraphic section, start measured depths from the portion of interest in the stratigraphic section, ending measured depths from the portion of interest in the stratigraphic section, dips from the portion of interest in the stratigraphic section, and thicknesses from the offset/type tops table;
      (c) determine a first point along the plotted curves for each formation in the stratigraphic cross section that represents a starting point for the portion of interest in the stratigraphic section;
      (d) determine a second point along the plotted curves for each formation in the stratigraphic cross section that represents an ending point for the portion of interest in the stratigraphic section, wherein the portion of interest in the stratigraphic section represents a formation within the portion of interest in the stratigraphic cross section, wherein the first point comprises a first X-axis value and a first Y-axis value, and wherein the second point comprises a second X-axis value and a second Y-axis value;
      (e) use the second X-axis value of a previous portion of interest in the stratigraphic section as the start measured depth for a current portion of interest in the stratigraphic section;
      (f) calculate the first Y-axis value for the current portion of interest in the stratigraphic section by summing the second Y-axis value of the previous portion of interest in the stratigraphic section with a true vertical depth offset of the current portion of interest in the stratigraphic section;
      (g) use the second X-axis value of the current portion of interest in the stratigraphic section as an ending measured depth for the current portion of interest in the stratigraphic section;
      (h) calculate a change in measured depth as an absolute value of a difference in the ending measured depth and the starting measured depth of the current portion of interest in the stratigraphic section;
      (i) calculate a change in true vertical depth by multiplying a tangent of a negation of a dip angle for the current portion of interest in the stratigraphic section with the change in measured depth of the current portion of interest in the stratigraphic section; and
      (j) calculate the second Y-axis value by summing the first Y-axis value and the change in true vertical depth of the current portion of interest in the stratigraphic section;
   (v) plotting an actual drilling path for the drill string using an actual survey from the actual drilling path;
   (vi) overlaying the actual drilling path onto a projected path in the stratigraphic cross section in the wellbore profile, thereby enabling real-time updating of the actual drilling path over the projected path as an executive dashboard;
   (vii) transmitting the executive dashboard from the geo-steering system to the drill rig indicating that the wellbore of the drill string operated by the drill rig is on target or off target; and
   (viii) transmitting the executive dashboard to a multidimensional simulation allowing a user to select a dimensional plot of the operation of the drill rig, wherein the equipment forms an operational drilling rig with horizontal, lateral, and directional drilling, wherein drilling operations can be adjusted in real time, with an ability to change direction to stay on target in the wellbore within 3 to 12 hours.

2. The drilling rig of claim 1, wherein the tool connected to the drill string for collecting wellbore data comprises a measuring while drilling tool or a logging while drilling tool.

3. The drilling rig of claim 1, wherein the collected wellbore data comprises: a measured depth, an inclination, an azimuth, and gamma ray counts.

4. The drilling rig of claim 1, wherein the drill string comprises a drill bit.

5. The drilling rig of claim 3, wherein the rig drilling functions are controlled using the geo-steering system comprises controlling the inclination and the azimuth of the drill bit.

6. The drilling rig of claim 1, wherein the controller comprises non-transitory computer readable medium containing controller computer instructions stored in the controller data storage to instruct the controller processor to receive the wellbore data from the tool; transmit the wellbore data to the geo-steering system, receive data from the geo-steering system; present the wellbore profile, the stratigraphic cross section, the actual drilling path, and the projected path to a user; and offer to the user a link to the multidimensional simulation.

7. The drilling rig of claim 1, wherein the wellbore data is transmitted over a network.

8. The drilling rig of claim 1, wherein the multi-dimensional simulations comprise: a three dimensional plot of a projected path for a drill string simultaneously as superimposed over the stratigraphic cross section, wherein the three dimensional plot has a northing as the "y" axis, an easting as the "x" axis, and a true vertical depth as the "z" axis and the actual drilling path.

9. The drilling rig of claim 1, wherein drilling on target comprises a region within a formation though which a user desires to drill, and drilling off target comprises a region that a user does not desire to drill.

10. The drilling rig of claim 1, wherein the geo-steering system comprises:
   a. directional drilling equipment in communication with the geo-steering processor, wherein the geo-steering processor receives data from the directional drilling equipment and sends data, commands, or combinations thereof to the directional drilling equipment to steer a drill bit in the wellbore;
   b. a geo-steering data storage in communication with the processor;
   c. non-transitory computer readable medium containing computer instructions stored in the data storage to instruct the processor to create an executive dashboard and to present the executive dashboard on a display to a user in real-time, wherein the executive dashboard presents:
      (i) at least a portion of the received data;
      (ii) at least a portion of interest in a stratigraphic cross section for user identification of: the drill bit in the stratigraphic cross section, formations in the stratigraphic cross section, and other formation data; or
      (iii) combinations thereof; and
   d. non-transitory computer readable medium containing computer instructions stored in the data storage to instruct the processor to:
      (i) identify a projected path for the drill bit during directional drilling, and to store the projected path in the data storage;
      (ii) import data from a second data storage to an offset/type table within the data storage including a plurality of offset/type tops of a projected formation through which the projected path is expected to pass;
      (iii) import data including an actual survey of the wellbore from the second data storage, a third data storage, or combinations thereof into the data storage;
      (iv) import data including a geological prognosis from the second data storage, the third data storage, a fourth data storage, or combinations thereof to a prognosed tops table within the data storage, wherein the geological prognosis comprises at least one depth for at least one formation top through which the projected path is expected to pass;
      (v) compute a wellbore profile using the imported data, wherein the wellbore profile is a composite visualization of a plurality of true vertical depths;
      (vi) compute the stratigraphic cross section for the wellbore profile, wherein the stratigraphic cross section comprises:
         1. a formation dipping away from an angle perpendicular to a horizontal plane representing a surface surrounding the wellbore;
         2. a formation dipping toward the angle perpendicular to the horizontal plane representing the surface surrounding the wellbore; or
         3. combinations thereof;
      (vii) plot an actual drilling path for the drill bit using the actual survey;
      (viii) overlay the actual drilling path onto the projected path in the stratigraphic cross section in the wellbore profile, thereby enabling real-time updating of the actual drilling path over the projected path; and
      (ix) present control buttons to the user on the executive dashboard enabling the user to increase or decrease a member of the group consisting of: a start measured depth of the wellbore, an ending measured depth of the wellbore, a true vertical depth offset of the wellbore, a dip of the projected formation, and combinations thereof for the portion of the stratigraphic cross section.

11. The drilling rig of claim 1, wherein the stratigraphic cross section is calculated using:
   a. one of the plurality of offset/type tops of the projected formation through which the projected path is expected to pass;
   b. the start measured depth;
   c. the ending measured depth;
   d. the true vertical depth offset; and
   e. the dip.

12. The drilling rig of claim 1, wherein the executive dashboard further comprises a member of the group consisting of:
   a. an actual scale factor button allowing the user to increase or decrease the scale factor of the actual curve for both of the relative matching graphs;
   b. a control button to set, change, increase, or decrease a starting true vertical depth offset of the type log curve for both of the relative matching graphs;
   c. a control button for each of the relative matching graphs allowing the user to depth zoom-in;
   d. a control button for each of the relative matching graphs allowing the user to depth zoom-out;
   e. a control button for each of the relative matching graphs allowing the user to value zoom-in;
   f. a control button for each of the relative matching graphs allowing the user to value zoom-out;
   g. a control button for each of the relative matching graphs allowing the user to scroll up along each relative matching graph;
   h. a control button for each of the relative matching graphs allowing the user to scroll down along each relative matching graph;
   i. a control button to add stratigraphic cross sections to the wellbore profile;
   j. a control button to delete stratigraphic cross sections from the wellbore profile;
   k. a first indicator to identify dipping away from the projected path;
   l. a second indicator to identify dipping towards the projected path;
   m. a first navigation control for moving the portion of interest in the stratigraphic section in a first direction along the stratigraphic cross section;
   n. a second navigation control for moving portion of interest in the stratigraphic section in a second direction along the stratigraphic cross section;
   o. a legend showing: a planned wellbore, an actual wellbore, formation names, a current formation name, a next formation name, total gas curves, gamma ray curves, or other curves;

p. at least one speed control button to control a rate of adjustment for at least one of the control buttons; and q. combinations thereof.

13. The drilling rig of claim 12, wherein each relative matching graph includes an indication of: a first formation/marker top, a second formation/marker top, and a third formation/marker top.

14. The drilling rig of claim 12, wherein the actual curve comprises: a gamma ray curve, a total gas curve, a geologic curve, a seismic curve, or combinations thereof.

15. The drilling rig of claim 12, wherein the executive dashboard further comprises a presentation of a toolbar, and wherein the toolbar includes a member of the group consisting of:

a. a job management menu that allows the user to choose at least one of the following options: new, open from local database, open from file, close, edit job information, save/export job to file, and exit program;

b. a report generation menu that allows the user to choose at least one of the following options: create a PDF report or create a rich text format report;

c. a tops button to produce a drop down menu allowing the user to edit type logs and edit prognosed tops tables;

d. a survey button that allows the user to choose at least one of the following: edit a planned survey or edit the actual survey;

e. a stratigraphy button that permits the user to edit stratigraphy adjustments to cause the correlation of the actual curve to the type log curve;

f. a curve button that enables the user to perform editing of continuous curves in the wellbore profile;

g. an update button that allows the user to update data from data sources in a synchronized manner;

h. a configure button that allows the user to select at least one of the following: formations, curves, data sources, data source mappings, alarms, number of days left on a license key, and information on validity of the license key;

i. a help button that allows the user to type questions and receive answers based on key words within the questions; and j. combinations thereof.

16. The drilling rig of claim 12, wherein the executive dashboard allows the user to correlate the actual curve to the type log curve by presenting controls to the user that allow the user to:

a. adjust a width of the portion of interest in the stratigraphic section; and b. adjust true vertical depth offset and the dip using the control buttons such that the actual curve overlays the type log curve to achieve the correlation.

17. The drilling rig of claim 1, wherein the actual survey includes a member of the group consisting of: a measured depth, an inclination, an azimuth, a tool type, a survey table name, a proposed azimuth, a target angle, a survey calculation method, a target true vertical depth, an initial true vertical depth, an initial vertical section, an initial northing, an initial easting, and combinations thereof.

18. The drilling rig of claim 1, wherein the offset/type table and the prognosed tops table, each includes a member of the group consisting of:

a. a table identifier that identifies offset/type tops being stored in the offset/type table or the prognosed tops table;

b. a formation name column;

c. a top depth of formations column;

d. a true vertical depth tops column;

e. a true vertical depths base column;

f. a subsea true vertical depth tops column;

g. a subsea true vertical depth base column;

h. a thickness of formation column;

i. a first selector button that allows the user to enter true vertical depths into the top depths of formations column;

j. a second selector button that allows the user to enter subsea true vertical depths into the top depths of formations column;

k. a save and close button that allows the user to save data into the data storage that has been edited in the tables and remove the table from the display;

l. a save button that allows the user to save data that has been edited in each of the tables;

m. a close button that allows the user to remove each of the tables from the display; and n. combinations thereof.

* * * * *